United States Patent
McKinley et al.

[19]

[11] Patent Number: 5,805,834
[45] Date of Patent: Sep. 8, 1998

[54] HOT RECONFIGURABLE PARALLEL BUS BRIDGING CIRCUIT

[75] Inventors: David E. McKinley, San Jose; Steven Pope, Los Gatos, both of Calif.

[73] Assignee: Zilog, Inc., Campbell, Calif.

[21] Appl. No.: 691,218

[22] Filed: Aug. 1, 1996

Related U.S. Application Data

[63] Continuation of Ser. No. 220,161, Mar. 30, 1994, abandoned.

[51] Int. Cl.$^6$ .................................................... G06F 13/00
[52] U.S. Cl. ...................... 395/283; 395/282; 395/200.51
[58] Field of Search .................................... 395/800, 500,
395/700, 828, 831, 882, 282, 283, 284,
308, 830, 833, 200.5, 200.51

[56] References Cited

U.S. PATENT DOCUMENTS

| | | | |
|---|---|---|---|
| 4,758,985 | 7/1988 | Carter | 365/94 |
| 5,015,885 | 5/1991 | El Gamal et al. | 307/465 |
| 5,183,404 | 2/1993 | Aldous et al. | 439/55 |
| 5,191,657 | 3/1993 | Ludwig et al. | 395/325 |
| 5,226,160 | 7/1993 | Waldron et al. | 395/650 |
| 5,265,238 | 11/1993 | Canova, Jr. et al. | 395/500 |
| 5,302,866 | 4/1994 | Chiang et al. | 307/465 |
| 5,327,531 | 7/1994 | Bealkowski et al. | 395/164 |
| 5,362,999 | 11/1994 | Chiang | 326/44 |
| 5,386,567 | 1/1995 | Lirn et al. | 395/700 |
| 5,396,602 | 3/1995 | Amini et al. | 395/325 |
| 5,410,707 | 4/1995 | Bell | 395/700 |
| 5,428,579 | 6/1995 | Robinson et al. | 365/230.03 |
| 5,430,793 | 7/1995 | Ueltzen et al. | 379/98 |
| 5,436,621 | 7/1995 | Macko et al. | 340/825.44 |
| 5,440,244 | 8/1995 | Richter et al. | 326/37 |
| 5,440,755 | 8/1995 | Harwer et al. | 395/800 |
| 5,446,869 | 8/1995 | Padgett et al. | 395/500 |
| 5,448,703 | 9/1995 | Amini et al. | 395/290 |
| 5,450,021 | 9/1995 | Chiang | 326/39 |
| 5,450,551 | 9/1995 | Amini et al. | 395/299 |
| 5,457,785 | 10/1995 | Kikonis et al. | 395/308 |
| 5,469,003 | 11/1995 | Kean | 326/39 |
| 5,497,490 | 3/1996 | Harada et al. | 395/700 |
| 5,499,346 | 3/1996 | Amini et al. | 395/308 |
| 5,519,851 | 5/1996 | Bender et al. | 395/500 |
| 5,542,055 | 7/1996 | Amini et al. | 395/281 |
| 5,579,489 | 11/1996 | Dornier et al. | 395/281 |

FOREIGN PATENT DOCUMENTS

| | | |
|---|---|---|
| 0628910 | 5/1994 | European Pat. Off. . |
| 0629956 | 5/1994 | European Pat. Off. . |
| 0631241 | 5/1994 | European Pat. Off. . |

OTHER PUBLICATIONS

LL–PD6729 Advance Data Sheet Cirrus Logic Corp., Nov. 93 p. 57.

216017/216M17 SL1868 PCMCIA–16 interface data sheets Zilog Corp. 1997 pp. 1–26.

286017/716017 Reference Manual Zilog Corp., 1997 Sections 1–4 Appendixes A–E.

Tom Shanley et al, PCI System Architecture, Second Edition Mindshare, Inc. 1993, pp. 187–241.

*Primary Examiner*—Mehmet B. Geckil
*Attorney, Agent, or Firm*—Majestic, Parsons, Siebert & Hsue

[57] ABSTRACT

A hot reconfigurable parallel bus bridging circuit is provided in a computer system which enables the computer system to communicate, via a peripheral port, with any one of plurality of incompatible standardized parallel bus systems. The hot reconfigurability of the bridging circuit of the present invention is accomplished using software to reconfigure or reprogram the various combinational logic gates, wait-state generators, and registers of the bridging circuit while the computer system is operating, without removing the bridging circuit from the computer system. The flexible hardware architecture of the present invention allows the computer system which houses this hardware to communicate with virtually any type of parallel bus system.

50 Claims, 16 Drawing Sheets

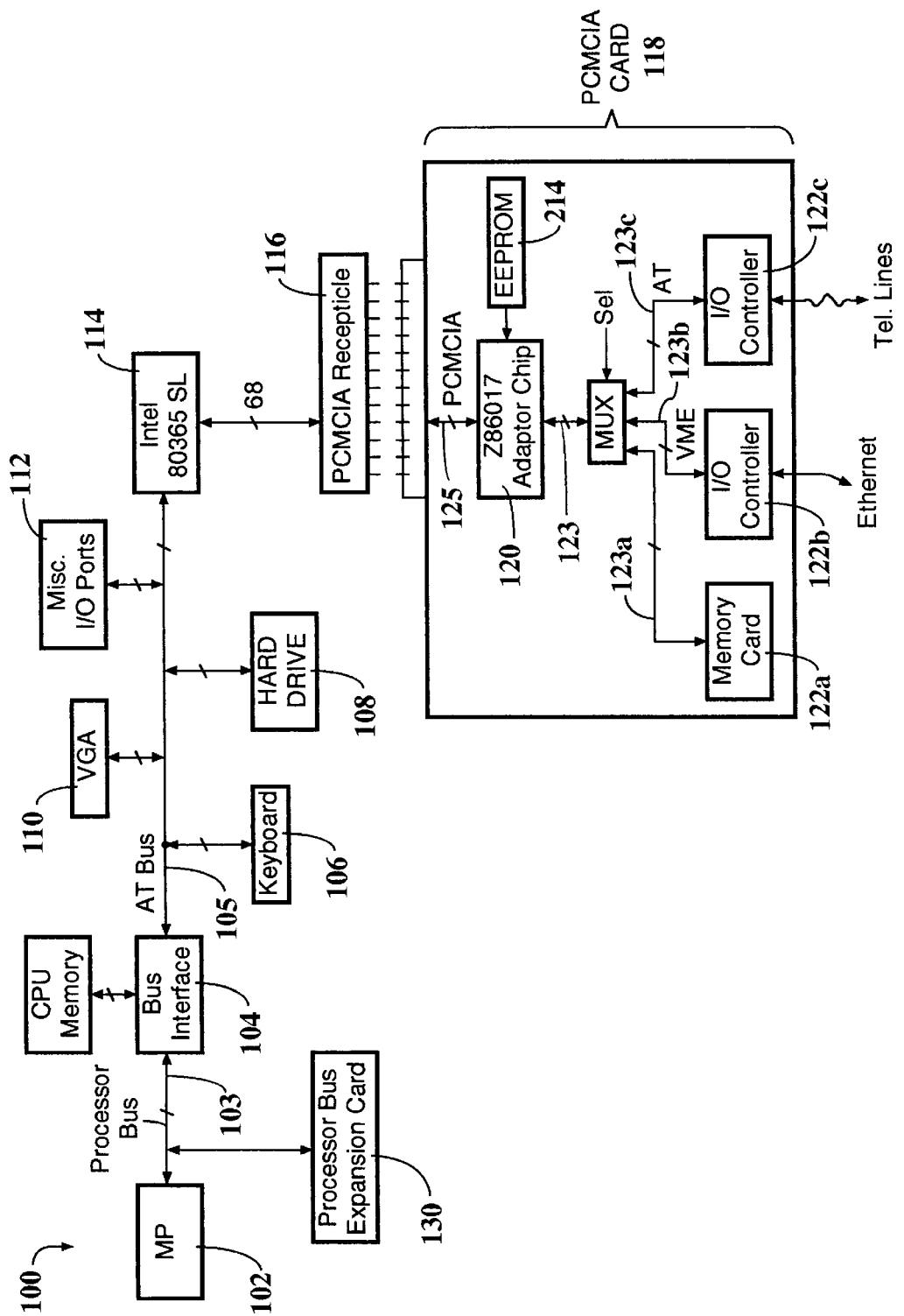
FIG._1.

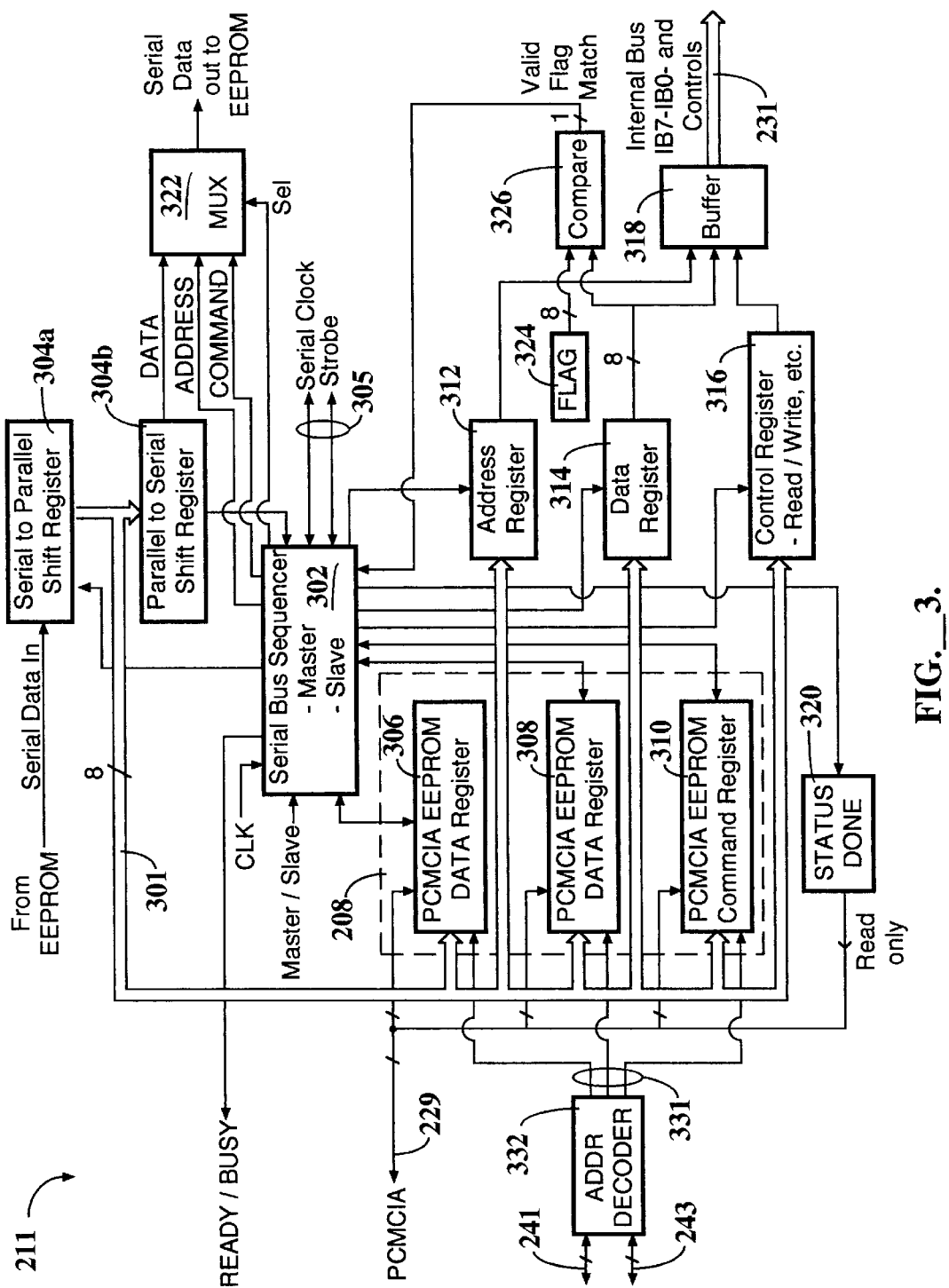
FIG._3.

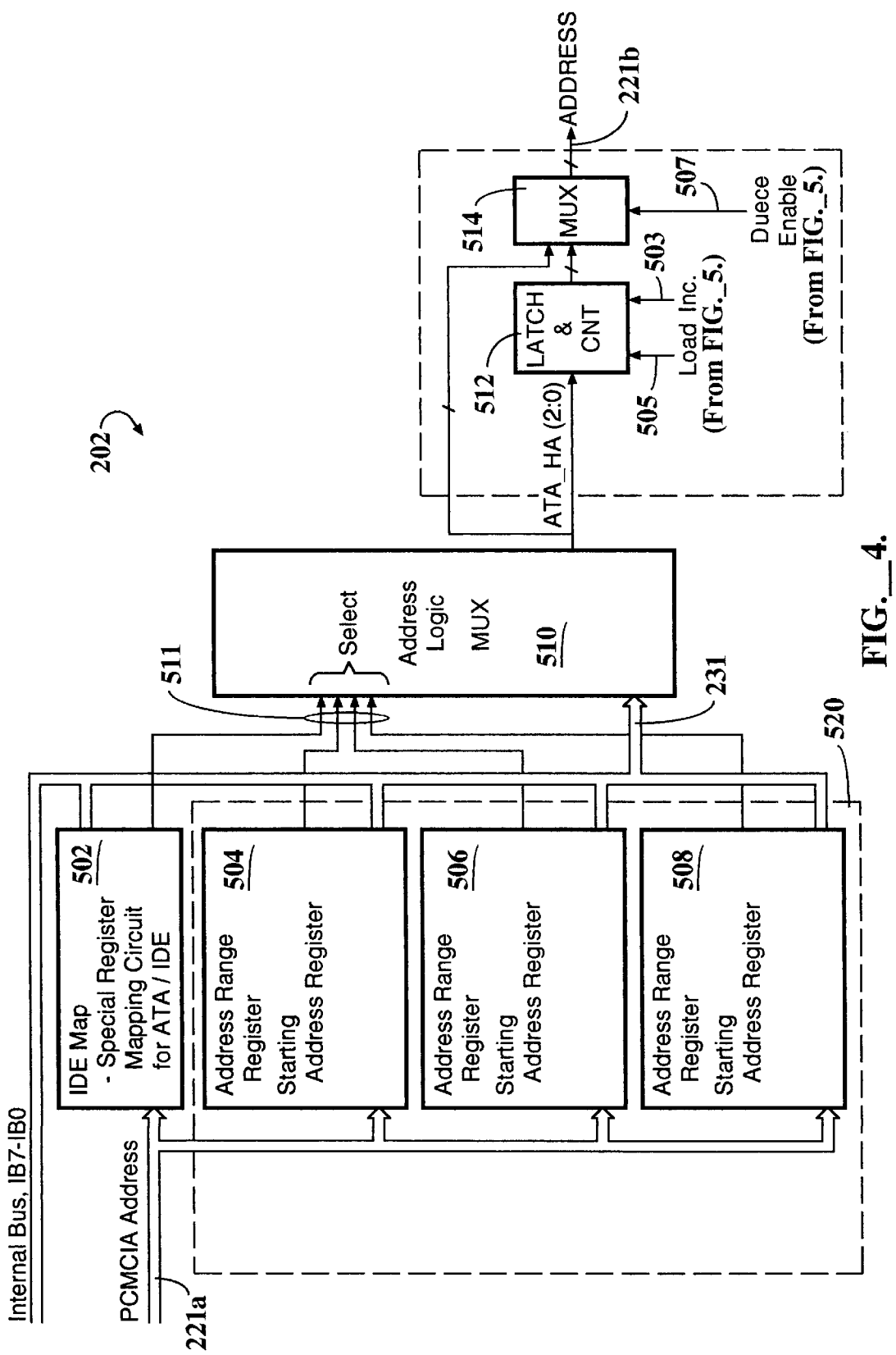
FIG._4.

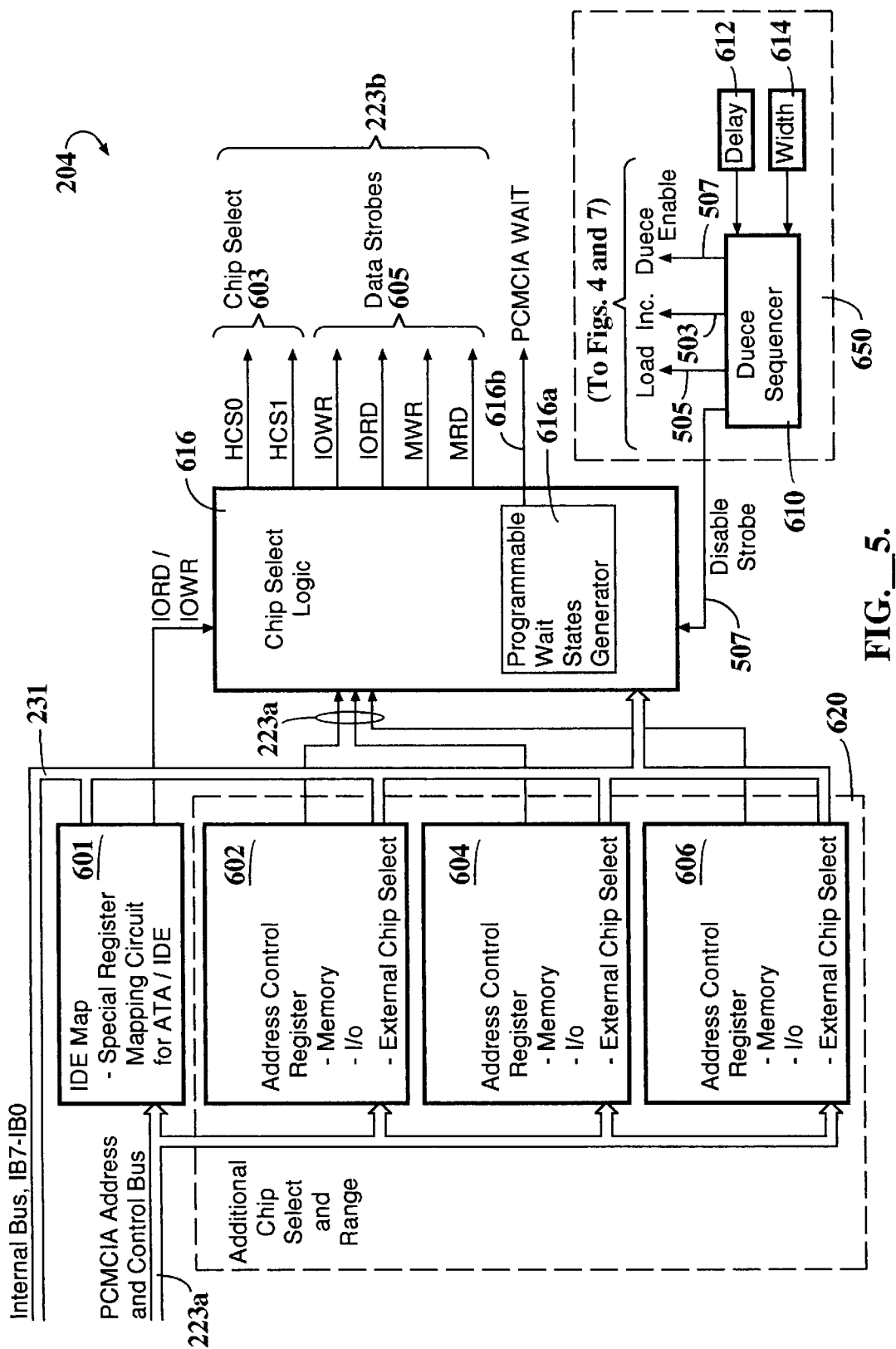
FIG._5.

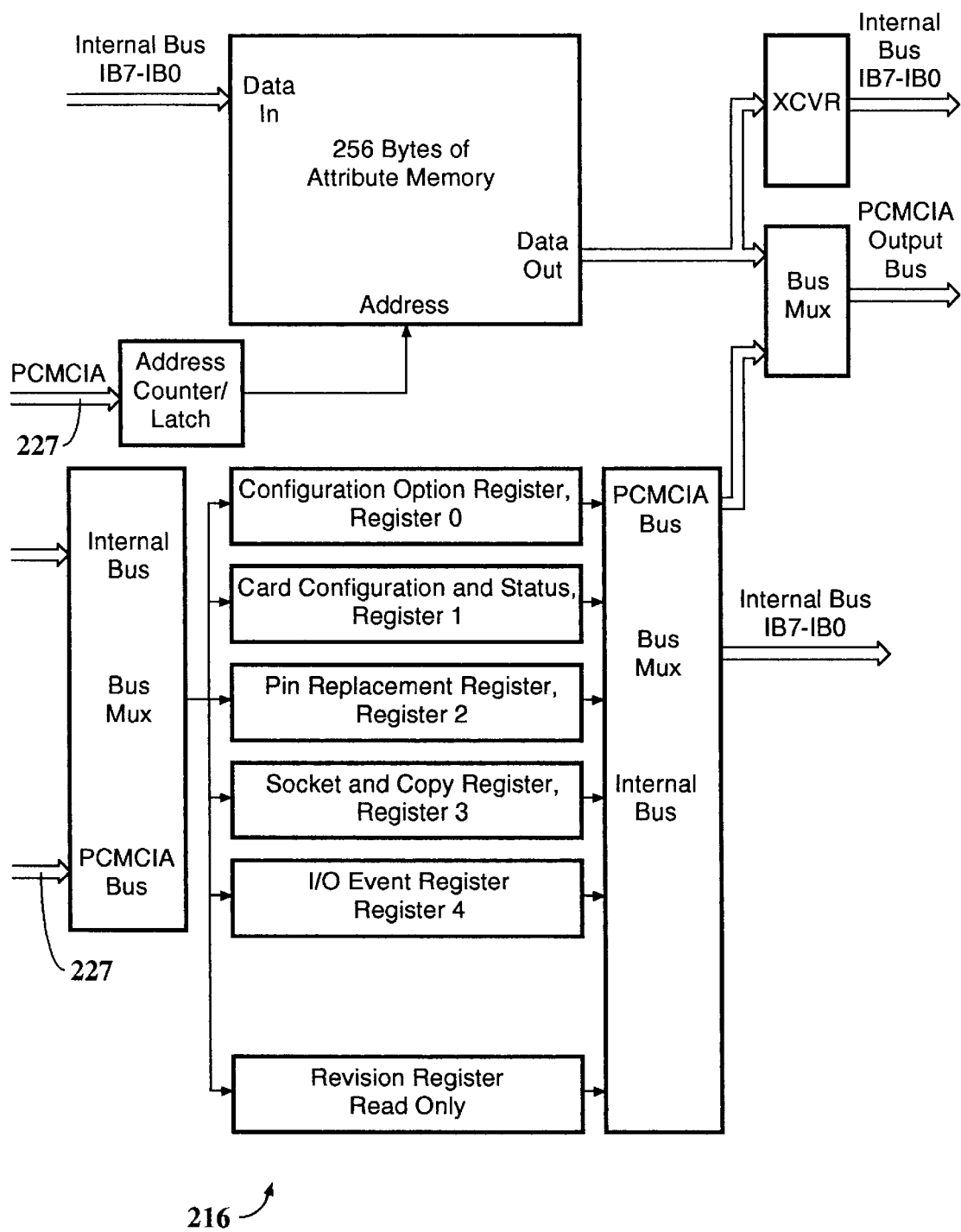
FIG._6.

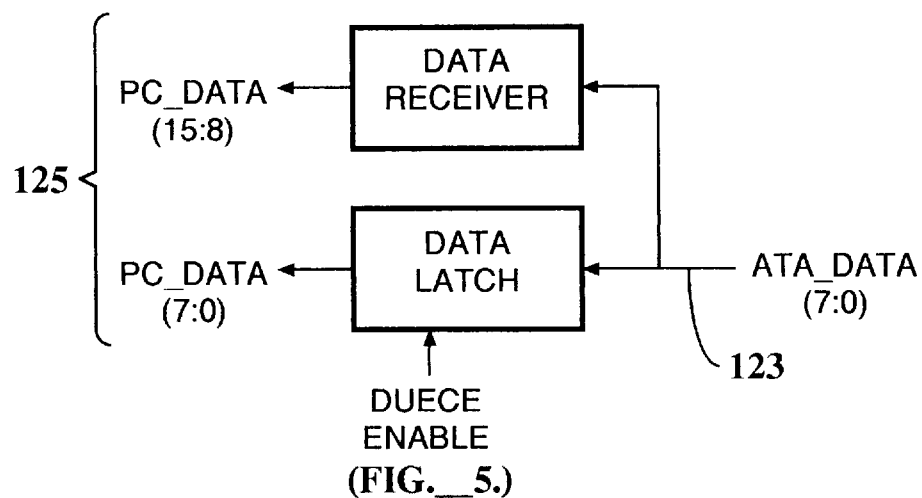
ATA_DATA (7:0) (Even Byte) Put onto PC_DATA (7:0)
ATA_DATA (7:0) (Odd Byte) Put onto PC_DATA (15:8)
FIG._7A.
PCMCIA HOST READS
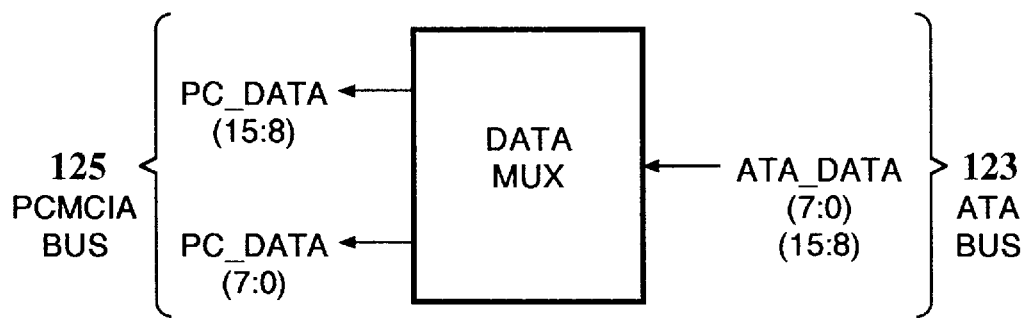
PC_DATA (7:0) (Even Byte) Written to ATA_DATA (7:0)
PC_DATA (15:8) (Odd Byte) Written to ATA_DATA (7:0)
FIG._7C.
PCMCIA HOST WRITES

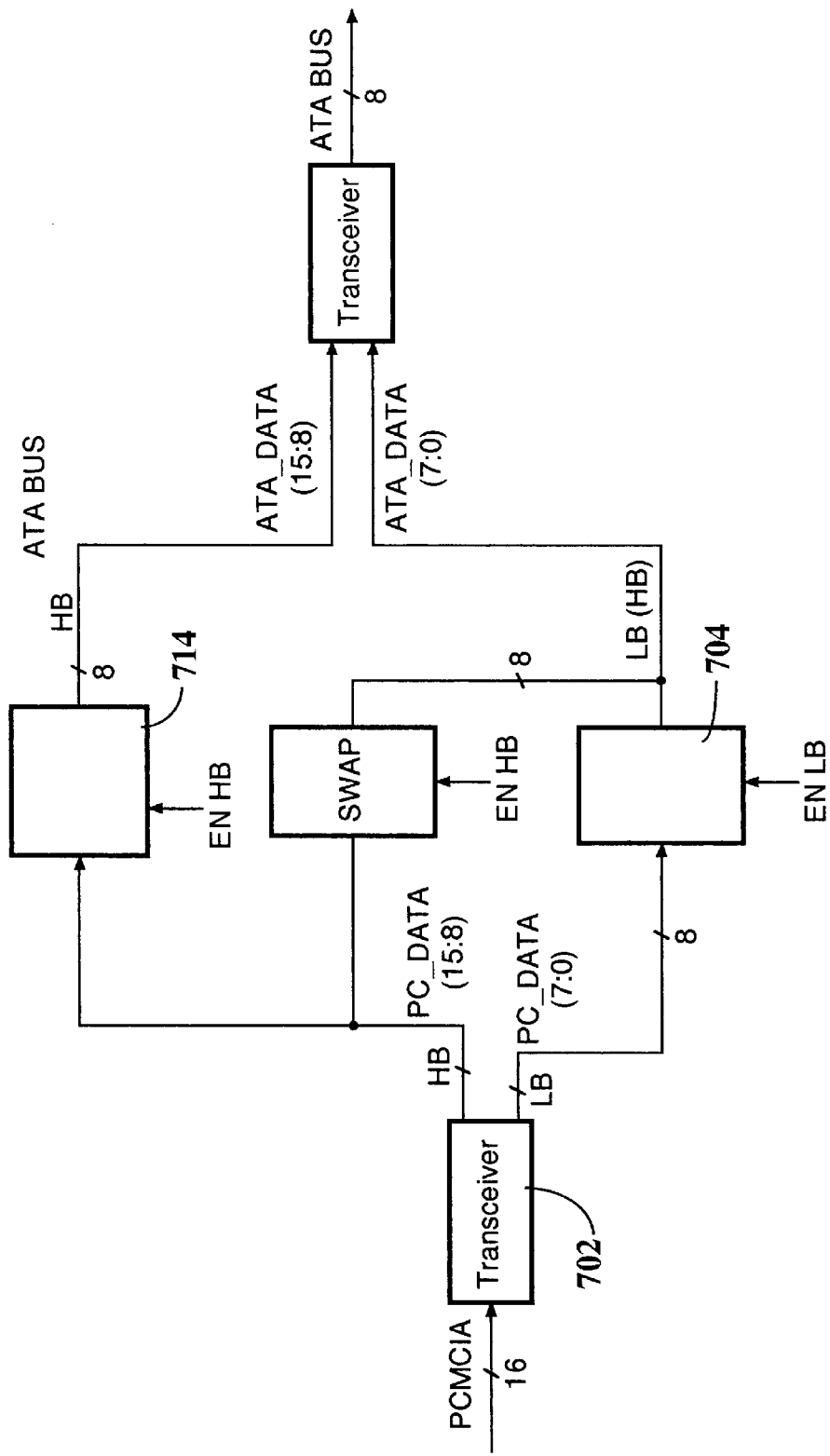
FIG._7D.
(WRITE)

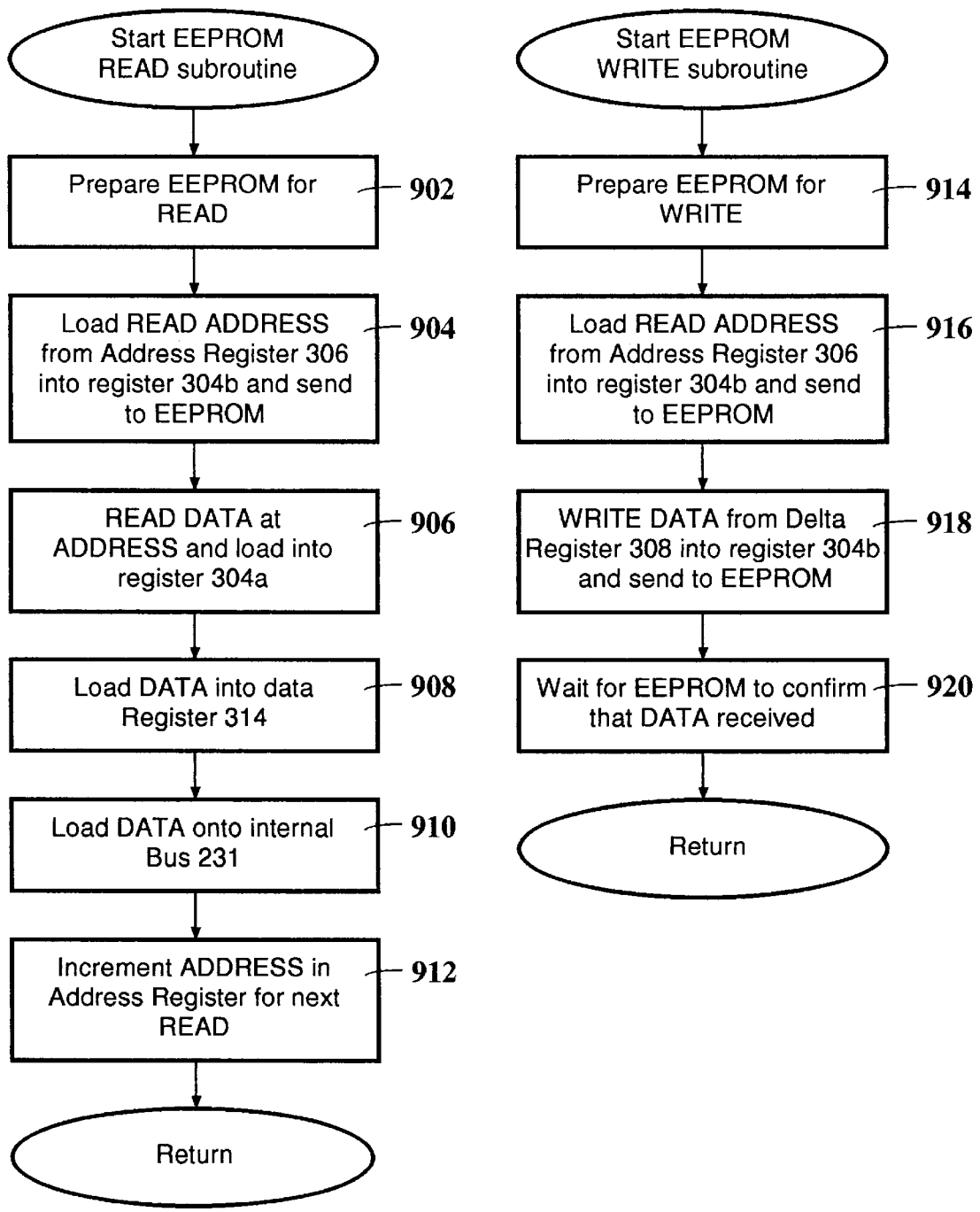
FIG._9A.   FIG._9B.

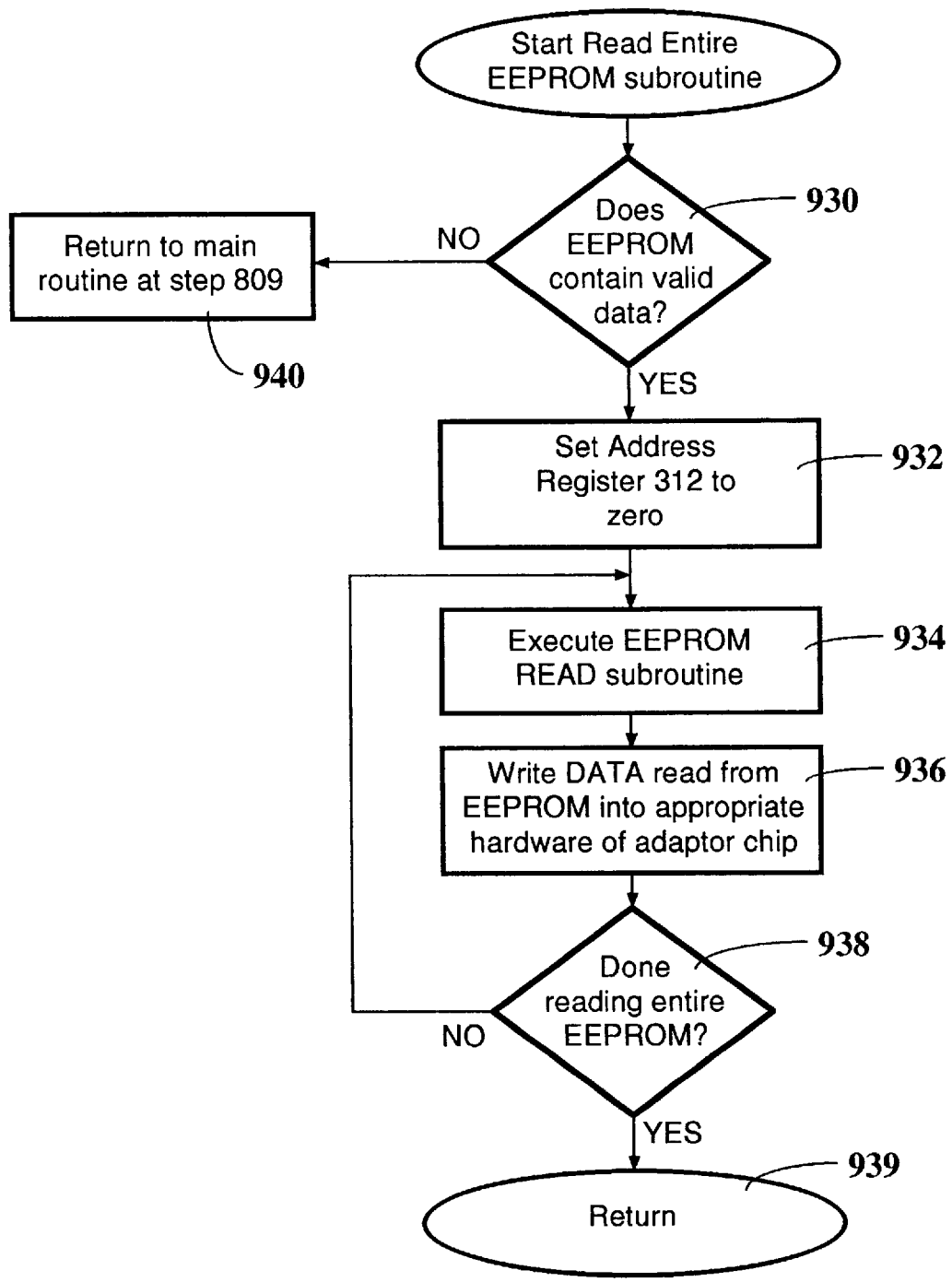
FIG._10.

HOT RECONFIGURABLE PARALLEL BUS BRIDGING CIRCUIT

This is a continuation of application Ser. No. 08/220,161, filed Mar. 30, 1994 now abandoned.

BACKGROUND OF THE INVENTION

The present invention relates to the field of computer bus system communications, and more particularly to a hot reprogrammable parallel bus bridging circuit which is used to bridge a first parallel bus system to a second parallel bus system.

As the use of computer systems and computer related communication increases, there is an ever present need to increase the accessibility to such computer systems in order to broaden the utility of the computer system for the user. Presently, many computer systems are configured with serial and/or parallel peripheral ports which provides the computer with the ability to communicate with other computer systems, communication systems and/or peripheral devices. For example, a typical, conventional computer system may come equipped with a parallel printer port and a serial communications port.

Typically, each of the peripheral ports within a particular computer system is specifically configured to perform a specialized task. The specialized function of each of the peripheral ports of the computer system is controlled by individual controller circuits, each of which having a platform specifically adapted to communicate with its associated peripheral device or other peripheral devices operating under the same platform. Thus, for example, the printer peripheral port is specifically configured to allow the internal bus of the computer system to communicate with a standardized bus system (or platform) used in peripheral printing devices. Similarly the modem peripheral port of the computer system is specifically configured by a modem controller circuit to allow the internal bus of the computer system to communicate with a standardized bus system used in modem peripheral devices.

To allow the peripheral controller circuit to communicate with the CPU of the computer system, each of the peripheral controller circuits are connected to the internal bus of the computer system via a corresponding dedicated bridging circuit, which bridges the two incompatible bus systems together. Each dedicated bridging circuit is specifically designed to bridge the standardized bus system of a particular group of peripheral devices to the standardized bus system used internally by the computer.

One limitation which is common to conventional computer systems is that once a dedicated bridging circuit has been physically installed into the computer system, that bridging circuit cannot be used to bridge any other peripheral device which operates from a different standardized bus system. In other words, the bridging circuit's function remains dedicated to the specific task it was preprogrammed to perform. The only way to reconfigure the bridging circuit would be to physically remove the bridging circuit from the computer system, externally reprogram the bridging circuit, and reinstall the bridging circuit into the computer system. This is called cold reconfigurability.

For example, if the bridging circuit were configured to bridge an AT bus system to a PCMCIA bus system, that circuit could not be used to bridge the AT bus systems to an SCSI bus system without physically removing the bridging circuit from the computer system, reconfiguring it to form an AT-SCSI bridge, and then reinstalling the reconfigured bridge back into the computer system. Note further that after these steps have been taken, the bridging circuit will no longer be able to bridge the previous peripheral bus system to the computer system, unless, of course, the bridging circuit is again removed from the computer system, reprogrammed, and reinstalled.

As a consequence, computer systems of today utilize a plurality of specialized bridging circuits to accommodate the need for the computer system to be interconnected to an ever increasing number different standardized bus systems. This, in turn increases the size and cost of the computer system.

Accordingly, it is an object of the present invention to provide a hot reconfigurable bridging circuit which can be reconfigured while operating the computer system, and without removing the bridging circuit from the computer system, to allow the computer system to communicate with any one of a number of incompatible standardized bus systems.

SUMMARY OF THE INVENTION

This and additional objectives are accomplished by the various aspects of the present invention wherein, briefly, according to a principle aspect a hot reconfigurable parallel bus bridging circuit is provided in a computer system which enables the computer system to communicate, via a peripheral port, with any one of plurality of incompatible standardized parallel bus systems.

Accordingly, a first aspect of the present invention is directed to a reprogrammable adaptor circuit for bridging an internal computer system bus to a second parallel bus system which is not directly compatible with the internal bus system. The adaptor circuit comprises a bridging circuit responsive to configuration programming information for bridging a communication path between the internal bus system and the second bus system; a memory storage device for storing the configuration programming information; programming means for configuring the bridging circuit in accordance with the configuration programming information to thereby establish a bridge to communication path; and means for changing the configuration programming information stored within the memory storage device without physically removing the storage device where the bridging circuit from the adaptor circuit, wherein the changed configuration information allows the bridging circuit to bridge a communication path between the internal bus system and a third parallel bus system.

A second aspect of the present invention is directed to a computer system for communicating between the first parallel bus system and a second parallel bus system not directly compatible with the internal bus system. The computer system comprises a CPU; at least one peripheral port; a reconfigurable adaptor circuit connected to the peripheral port for bridging a communication path between the internal bus system and the second bus system; and means for reconfiguring the adaptor circuit without physically removing the adaptor circuit from the computer system to thereby enable the adaptor circuit to bridge a communication path between the internal bus system and a third parallel bus system.

A third aspect of the present invention is directed to a method for communicating between an internal computer system bus and at least one of a plurality of other bus systems, wherein the internal bus system is part of a computer system which also comprises a peripheral port and a parallel bus bridging circuit. The method comprises the steps of configuring the bridging circuit to bridge a communication path between the internal bus system and a second bus system without physically removing the bridging circuit from the computer system; communicating data between the internal bus system and the second bus system via the peripheral port and configured bridging circuit; reconfiguring the bridging circuit to bridge a communication path between the internal bus system and a third bus system without physically removing the bridging circuit from the computer system; and communicating data between the internal bus system and the third bus system via the peripheral port and reconfigured bridging circuit.

A fourth aspect of the present invention is directed to a method for establishing a communication path between an internal computer system bus and one of a plurality of other bus systems via a peripheral port and bridging circuit, wherein the internal bus system, peripheral port and bridging circuit are all part of the same computer system. The method comprises the steps of storing configuration programming information in a memory storage device located within the computer system without physically removing the storage device from the computer system; configuring the bridging circuit, using the stored configuration programming information, to bridge a communication path between the internal bus system and a second bus system without removing the bridging circuit from the computer system; and establishing a communication path between the internal bus system and the second bus system via the peripheral port and bridging circuit, thereby enabling an exchange of information to take place between the two parallel bus systems.

A fifth aspect of the present invention is directed to a method for reconfiguring a bridging circuit within a computer system to bridge a communication path between an internal bus of the computer system and one of a plurality of other bus systems not directly compatible with the internal bus. The method comprises the steps of writing configuration programming information into a memory storage device located within the computer system without physically removing the storage device from the computer system; reading the written configuration programming information from the memory storage device; and using the configuration programming information read from the memory storage device to configure the bridging circuit to bridge a communication path between the internal bus system and one of the plurality of other bus systems.

In accordance with the aspects described above, the present invention provides much needed flexibility to a computer system by enabling the computer system to communicate with any one of a plurality of incompatible bus systems using a single bridging circuit.

The hot reconfigurability of the bridging circuit of the present invention is accomplished using software to reconfigure or reprogram the various combinational logic gates, wait-state generators, and registers of the bridging circuit while the computer system is operating, without removing the bridging circuit from the computer system. The flexible hardware architecture of the present invention allows the computer system which houses this hardware to communicate with virtually any type of parallel bus system.

Additionally, the bridging circuit of the present invention can be reconfigured at any time, either at start-up, or while the computer is operating. This allows for multiple peripheral devices to be connected through one bridging circuit since the circuit can be reconfigured via software (i.e. hot reconfiguration) to interface any type of parallel bus system at any given moment. Also, because the bridging circuit of the present invention is reconfigured internally by a microprocessor of the computer system, both the hardware and software aspects of the reconfiguration are transparent to the user.

Lastly, the reconfigurable bridging circuit of the present invention is designed to interface not only incompatible peripheral bus systems, but is also designed to interface incompatible memory mapping schemes, compatible bus systems or memory mapping schemes, and even is designed to interface bus systems using a word-based platform to bus systems using a byte-based platform.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 3 is a functional block diagram of the controller circuit 211 of FIG. 2B which controls the exchange of configuration programming information used to reconfigure the bridging circuit of the present invention.

FIG. 4 shows a functional block diagram of address block 202 of FIG. 2B.

FIG. 5 shows a functional block diagram of the control/status block 204 of FIG. 2B.

FIG. 6 is a functional block diagram of the attribute memory block 216 of FIG. 2B.

FIG. 7A illustrates the technique of the present invention for reading data from a byte-based bus system to a word-based bus system.

FIG. 7C illustrates the technique of the present invention for writing data from a word-based bus system to a byte-based bus system.

FIG. 7D shows a more detailed functional block diagram of the circuit of FIG. 7C.

FIG. 9A is a flow diagram illustrating the EEPROM read subroutine 840 of FIG. 8.

FIG. 9B is a flow diagram illustrating the EEPROM right subroutine 832 of FIG. 8.

FIG. 10 is a flow diagram of the read entire EEPROM subroutine 806 of FIG. 8.

DETAILED DESCRIPTION OF THE PREFERRED EMBODIMENT

The present invention is a general purpose adaptor chip, or bridging circuit, used on the card side of an interface between an insertable peripheral card and a computer system. The present invention easily configures to all types of memory and I/O mapped peripheral hardware. Mapping is performed from the I/O and memory mapped bus of the computer system to local peripheral integrated circuits that support Ethernet controls, UARTs, modems, printer ports, solid state memory, rotating disk memory, and other peripheral devices.

The present invention can be used in a stand-alone configuration without the use of a local processor by providing all of the attribute memory, configuration information, range and interrupt types through a serial EEPROM. The serial EEPROM is read automatically using an eternal EEPROM sequencer. The present invention can also be configured through a slave processor for use on intelligent controller systems.

Figures 1, 8:
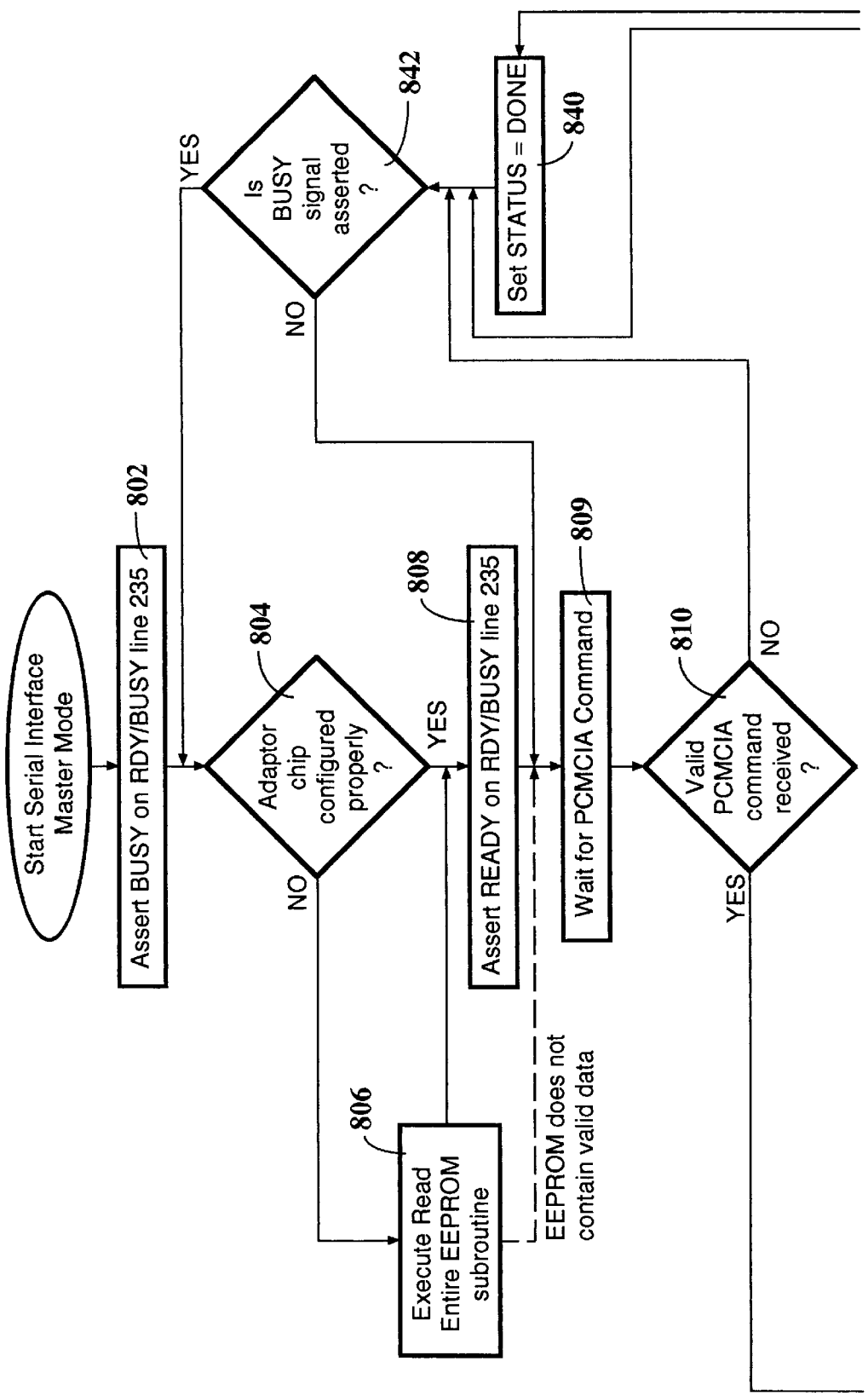
FIG. 1 shows a functional block diagram of a computer system which includes a reconfigurable bridging circuit of the present invention.
FIG. 8 is a flow diagram generally illustrating the sequence of programming procedures which are implemented during the reprogramming of the bridging circuit, wherein the configuration programming information is stored into and retrieved from an EEPROM external to the bridging circuit.

Referring first to FIG. 1, a functional block diagram of a computer system 100 is shown which includes a reconfigurable bridging circuit 120 in accordance with the present invention. The computer system 100 may generally be any type of computer system which uses a standardized internal bus format, and is not limited to the particular embodiment illustrated in FIG. 1. However, for illustrative purposes, the computer system 100 of FIG. 1 will herein be described in greater detail.

Computer system 100 comprises a microprocessor 102 connected via a processor BUS 103 to a bus interface 104. Bus interface 104 serves as a bridge between the processor BUS 103 and the main internal BUS 105 of the computer system. As illustrated in FIG. 1, internal BUS 105 is configured to be adaptable to a standardized AT bus system. As known to those skilled in the art, the AT bus system format is widely used in the computer industry, and for this reason may peripheral devices such as, for example, keyboard 106, VGA 110, and hard drive 108, are designed to be compatible with the AT bus format.

Connected to the AT BUS 105 is an additional bridging circuit 114 which bridges the communication path between the AT BUS 105 and a PCMCIA BUS 132. PCMCIA stands for personal computer memory card international association, which is one type of standardized bus format, commonly used in many of today's computer systems. BUS 132 is connected to a PCMCIA receptacle 116 for receiving an insertable peripheral function card 118.

The peripheral function card 118 may be used to perform a variety of functions. For example, card 118 may be configured to function as a memory expansion card, a modem, a multi-media interface, a SCSI interface, or an Ethernet interface, to name but a few.

Included within the peripheral function card 118 of FIG. 1 are a memory card 122a and two I/O controller chips 122b and 122c. The memory card 122a may be configured, for example, as an electronic disc drive which communicates with computer system 100 via a memory BUS 123a. As illustrated, I/O controller chip 122b comprises circuitry adapted to communicate with an external Ethernet-based computer system. The controller chip 122b communicates with computer system 100 via a VME BUS 123b. I/O controller chip 122c is illustrated as comprising circuitry such as, for example, a modem or a facsimile controller, which enables the controller chip 122c to communicate with a remote computer system via standard telephone lines. The controller chip 122c communicates with computer system 100 via an AT BUS 123c.

BUS 123a, 123b, and 123c are connected to a MUX which selects a particular bus to communicate via bus 123 to adaptor chip 120. The adaptor chip is, in turn, connected via a PCMCIA bus 125 to the PCMCIA receptacle 116.

As will be described herein, adaptor chip 120 can be configured to bridge a communication path between the PCMCIA bus 125 and any one of the other bus systems 123a, 123b, or 123c. After communication with a particular desired bus system has been completed, the adaptor chip can then be reconfigured to bridge a communication path between the PCMCIA bus 125 and another one of the other bus systems 123a, 123b, or 123c, without removing the adaptor chip 120 from the computer system 100.

Thus, and in accordance with the technique of the present invention, adaptor chip 120 may first be configured to allow memory information to be exchanged between the PCMCIA bus 125 and the memory card bus 123a. Then, while the computer system is operating, and without removing card 118 or adaptor chip 120 from the computer system, the adaptor chip may be reconfigured to bridge a communication path between I/O controller 122b and the PCMCIA bus 125. Additionally, if desired, adaptor chip 120 may again be reconfigured to bridge a communication path between PCMCIA bus 125 and the I/O controller bus 123c.

In the embodiment of FIG. 1, adaptor chip 120 is reprogrammed using configuration programming information stored within EEPROM 214. Alternatively, adaptor chip 120 may be reconfigured using information provided by a slave microprocessor (not shown). A more detailed description of the adaptor chip 120 is provided in FIGS. 2A and 2B, which are discussed below.

Figure 2A:
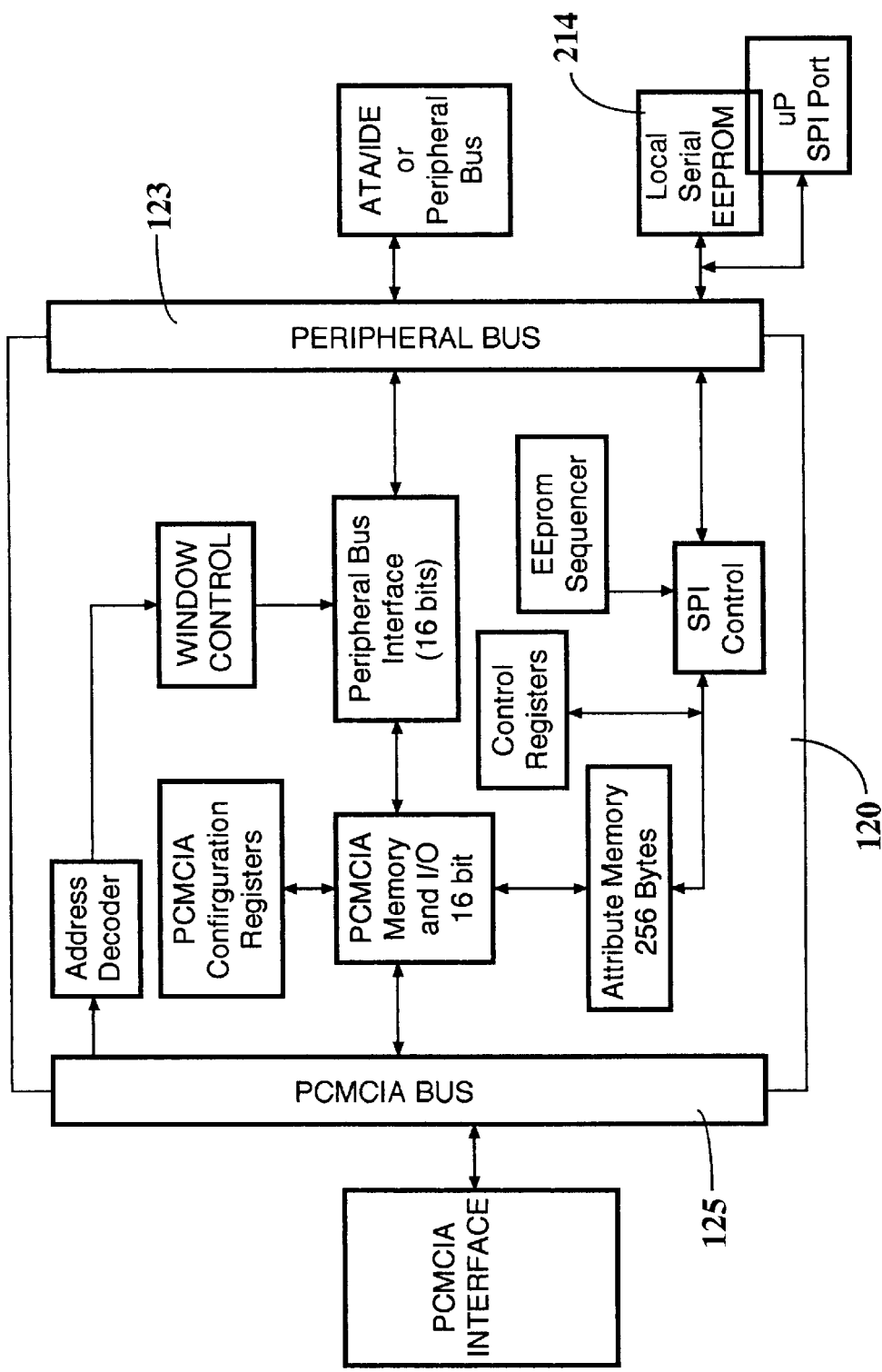
FIG. 2A shows a first representation of a functional block diagram of the reconfigurable bridging circuit 120 of FIG. 1.
Figure 2B:
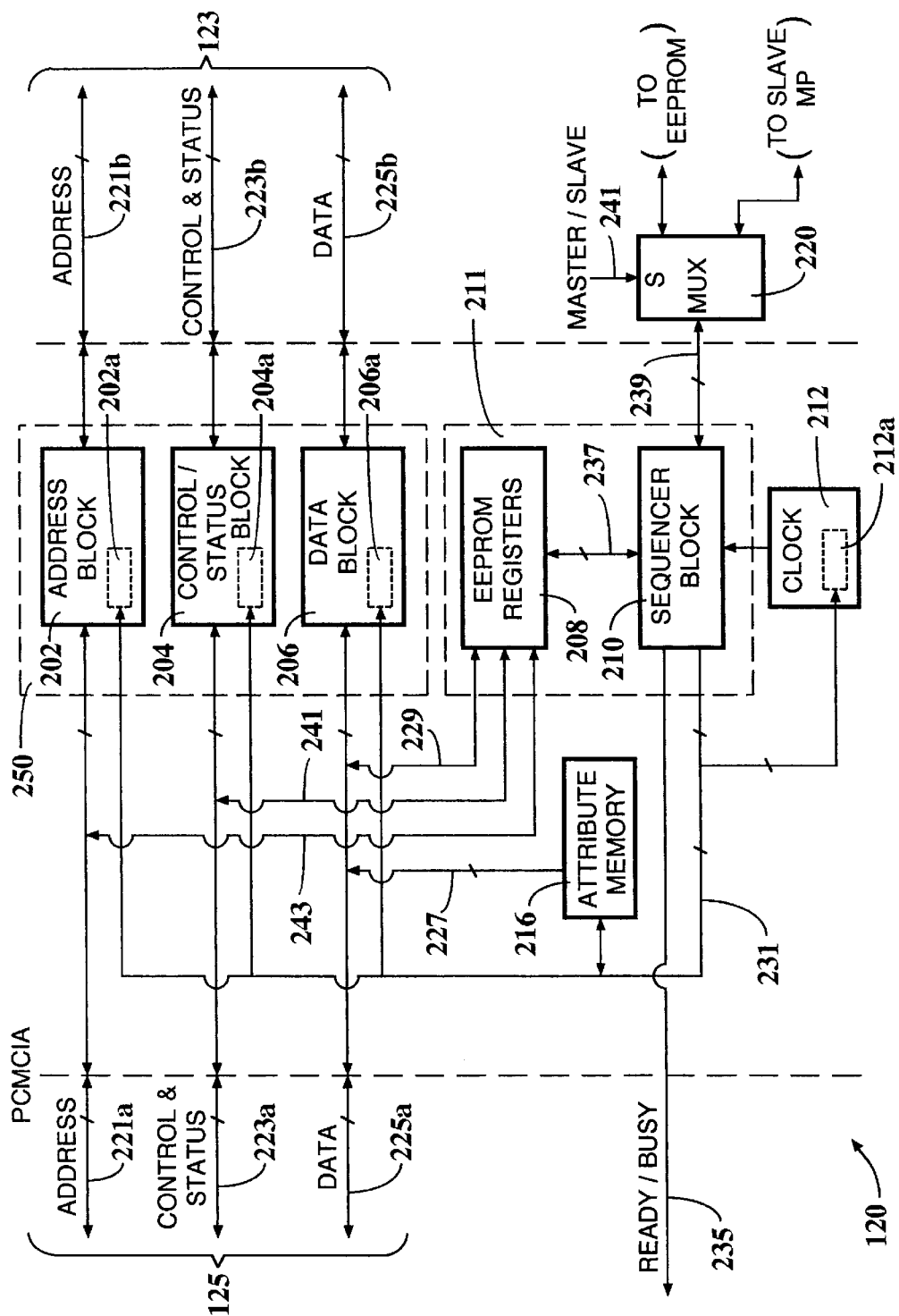
FIG. 2B shows a second representation of a functional block diagram of the reconfigurable bridging circuit 120 of FIG. 1.

FIG. 2A shows a first representation of a functional block diagram of the reconfigurable bridging circuit 120 of FIG. 1. This figure is intended to provide one skilled in the art with an understanding of the general internal configuration of bridging circuit 120. FIG. 2B shows a second, and slightly more detailed representation of a functional block diagram of the reconfigurable bridging circuit 120 of FIG. 1. For purposes of simplification and clarity, only the diagram of FIG. 2B will herein be discussed in greater detail.

FIG. 2B shows a functional block diagram of the reconfigurable bridging circuit 120 of FIG. 1. For purposes of illustration, adaptor chip 120 will be described with respect to bridging a PCMCIA bus 125 to a different parallel bus format, as denoted by bus 123. However, it is to be understood that the present invention is not limited to the particular embodiment shown in FIG. 2B, but may be adapted to bridge any first parallel bus system to any second parallel bus system including, but not limited to, ISA/AT, PCMCIA, IDE/ATA, programmed I/O interface, 68000/VME, and memory bus systems.

As shown in FIG. 2B, adaptor chip 120 comprises a plurality of reconfigurable functional blocks 250 for bridging the PCMCIA BUS 125 to the other parallel Bus system 123. By loading configuration programming information into the plurality of functional blocks 250, each of the functional blocks 202, 204, 206 may be reconfigured to bridge a communication path between BUS 125 and BUS 123.

The plurality of reconfigurable functional blocks 250 of FIG. 2B includes a reconfigurable address block 202, a reconfigurable control/status block 204, and a reconfigurable data block 206. Located within each of these blocks 202, 204 and 206, is a corresponding register array 202a, 204a and 206a which stores configuration programming information for configuring the circuitry of the functional block in which it resides. The plurality of registered arrays 202a, 204a, and 206a receive their respective configuration programming information from sequencer block 210, which receives the information from either an external EEPROM (214 of FIG. 1) or from a slave microprocessor (not shown). Note also that in addition to address block 202, control/status block 204, and data block 206 being reconfigured, clocking circuitry block 212 is also reconfigured to accommodate any changes in clock/timing frequencies. Once the clock is reconfigured, the clock output is used to drive sequencer block 210.

The process of reconfiguring the circuits of adaptor chip 120 depends upon whether the configuration programming information is supplied by the EEPROM 214 or by the slave microprocessor. Where the information for reconfiguring the adaptor chip 120 is supplied by a slave microprocessor (slave mode), the information is provided directly from the slave microprocessor into sequencer block 210. From there, sequencer block distributes the reconfiguration programming information to the appropriate hardware of bridging circuit 120 to be reconfigured.

Alternatively, adaptor circuit 120 may be connected to a plurality of slave microprocessors, each of which containing configuration programming information for reconfiguring the adaptor circuit 120. Such slave microprocessors, for example, may reside on the individual controller cards/chips 122a, 122b, and 122c (shown in FIG. 1), or one or more of the slave microprocessors may reside in a remote computer system (not shown). In either case, the bridging circuit 120 of the present invention is able to be reconfigured to bridge a communication path between a first parallel bus system 125 and one of a plurality of other parallel bus systems 123a, 123b, and 123c while the computer system 100 is operating, and without removing the adapting chip 120 from the computer system.

Bridging circuit 120 may also be reconfigured by information stored in an external EEPROM 214. Where the information for reconfiguring adaptor chip 120 is provided by external EEPROM 214 (master mode), the information is passed from the EEPROM into the sequencer block 210, whereupon the information is then distributed in a manner similar to that described above during the slave mode.

Note also that while the hardware within adaptor chip 120 is being reconfigured, the chip asserts a BUSY signal on line 235 to the microprocessor 102 of the computer system 100 (FIG. 1). While the BUSY signal is asserted, adaptor chip 120 will be inaccessible for use as a communication bridge. The computer system must wait until the READY signal is asserted on line 235 before the adaptor circuit 120 may be used to bridge together the two parallel bus systems 125 and 123. This assures that no erroneous exchange of data will take place between the two bus systems while the adaptor circuit is being reconfigured.

In the embodiment where the information for reconfiguring the adaptor chip 120 is provided by an external EEPROM 214, the present invention provides the ability for the EEPROM 214 to be loaded with new configuration programming information while the computer system 100 is operating, and without removing the EEPROM from the computer system. The new configuration programming information loaded into the EEPROM is then used to reconfigure the adaptor circuit 120 to bridge a communication path between BUS 125 and BUS 123.

In order to load the new configuration programming information into the EEPROM 214, the information is first sent into the EEPROM registers block 208 via lines 229, 241, and 243, which together make up BUS 125. EEPROM registers block 208 then transfers the information it receives into sequencer block 210, whereupon the information is then written into EEPROM 214. Note that while the EEPROM is being reprogrammed, bridging circuit 120 remains operational for bridging BUS 125 to BUS 123 until the bridging circuit itself is ready to be reconfigured. This means that line 235 will assert a READY signal while the EEPROM is being reprogrammed; the BUSY signal is not asserted until after the EEPROM 214 has been reprogrammed, but before the reconfiguring of the bridging circuit commences.

After bridging circuit 120 has been reprogrammed, the new characteristics of the reconfigured bridging circuit are loaded into the attribute memory block 216. The attribute memory block 216 comprises memory, such as, for example RAM for storing industry defined tuples (such as, for example, address ranges, pin configurations, status flags, etc.) which tell the host microprocessor 102 all about the new configuration of the adaptor chip 120 after it has been reconfigured.

A more detailed description of attribute memory block 216 is shown in FIG. 6. The standardized information which is stored in attribute memory block 216 is commonly known to those skilled in the art and therefore will not be discussed in greater detail in this application.

FIG. 3 shows a functional block diagram of the circuit 211 of FIG. 2B which handles the exchange of configuration programming information used to reconfigure bridging circuit 120 while the computer system is in use. Note that the circuit 211 is part of the hardware of the present invention for allowing bridging circuit 120 to be hot reconfigured— that is, reconfigured without the need to remove either the bridging circuit of the EEPROM from the computer system. Conventional bridging circuits are not able to be reconfigured in this manner. Instead, conventional bridging circuits can only be reconfigured by either removing the bridging circuit from the computer system and reconfiguring it externally, or by removing the EEPROM and reprogramming it externally to contain new configuration programming information, whereupon the externally reprogrammed EEPROM is placed back into the computer system and used to reconfigure the conventional bridging circuit.

Conventional bridging circuits are not able to achieve hot reconfigurability because such circuits do not include logic means for allowing new configuration data to be written into the EEPROM while the programmed logic is operating within the computer system. The present invention, however, includes such logic means by way of EEPROM registers 208 (FIG. 2) and other circuitry within bridging circuit 120 for writing new configuration programming information into the EEPROM while the EEPROM is operating within the computer system. This new information may then be used to reconfigure bridging circuit 120. In addition, the present invention also includes means for allowing a slave microprocessor to reconfigure bridging circuit 120. Such means are not provided in conventional bridging circuits.

As described previously, EEPROM 214 (FIG. 1) can be loaded with new configuration programming information for reconfiguring the adaptor chip 120 to bridge BUS 125 to BUS 123. Once the proper configuration programming information has been written into the EEPROM, that information can then be read from the EEPROM and distributed through the serial Bus sequencer 302 to reconfigure the appropriate hardware of the adaptor chip 120 to thereby form a circuit which will interface BUS 125 to BUS 123.

SERIAL INTERFACE, MASTER MODE

Figure 11:
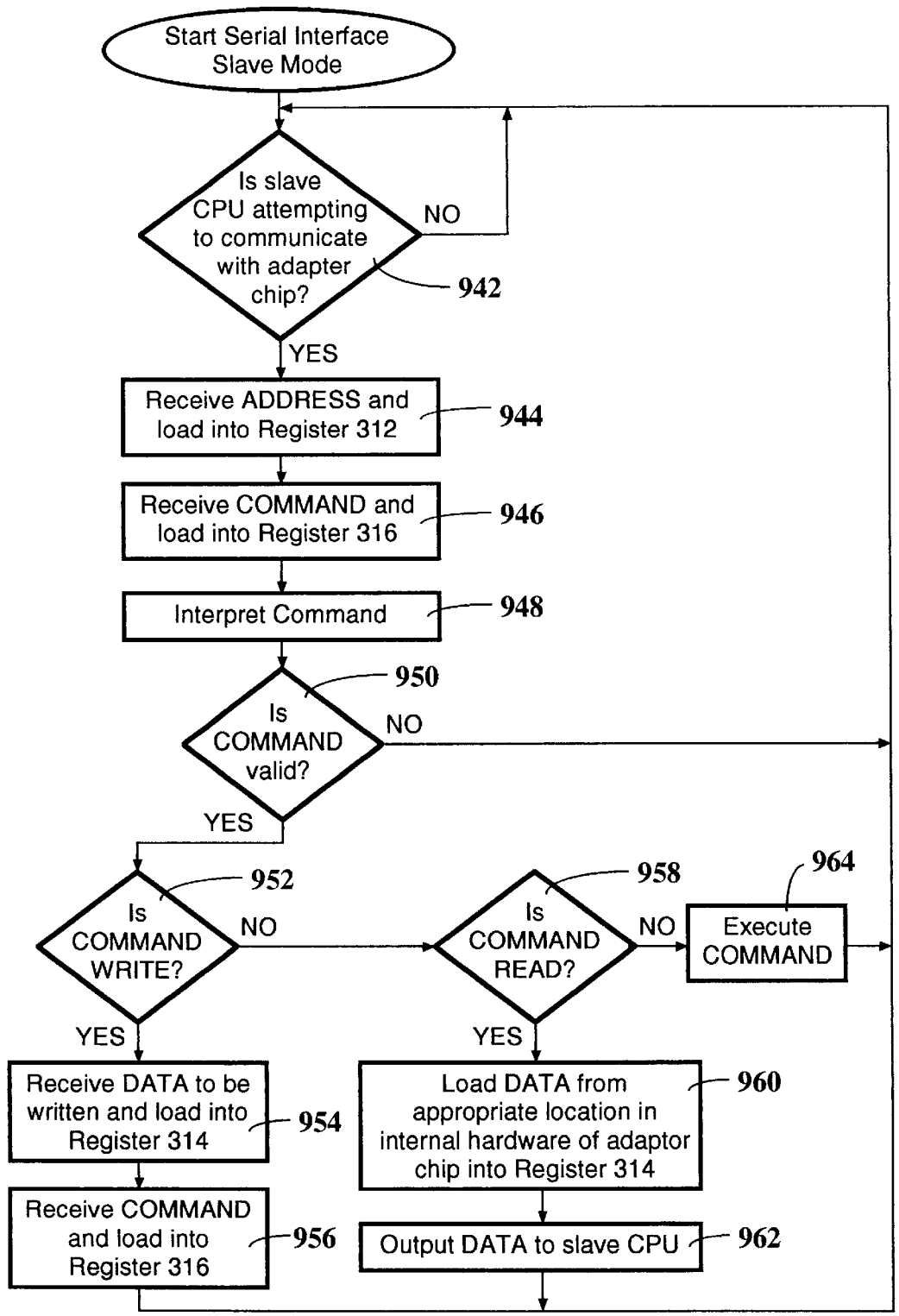
FIG. 11 is a flow diagram generally illustrating the various programming steps executed during the reconfiguring of the bridging circuit, wherein the configuration program information is provided by a salve microprocessor.

The procedure for serially interfacing configuration programming information between the EEPROM 214 and the adaptor chip 120 is illustrated is FIG. 8. This procedure is referred to as the serial interface procedure during master mode, where configuration programming information is written into and read from an external EEPROM. An alternate serial interface procedure during slave mode (where the adaptor chip 120 is reconfigured using information provided by a slave microprocessor) is generally shown in FIG. 11.

In order to illustrate how the bridging circuit of the present invention is able to be reconfigured without removing the circuit from the computer system, the procedure illustrated in FIG. 8 will now be described with respect to FIGS. 2 and 3. Note that each of the steps described in the flow diagrams of FIGS. 8–12 is controlled and executed by the bridging circuit itself, which, although not shown, includes within the Serial Bus Sequencer 302 a fixed state hardware sequencer which handles the control and timing operations for the hardware functions inside the adaptor chip.

As shown in FIG. 8, a first step in accessing bridging circuit 120 is to determine whether the circuit has been properly reconfigured, generally indicated in steps 802–808. In making this determination, bridging circuit 120 first asserts a BUSY signal on line 235 to prevent the computer system 100 from accessing the bridging circuit before it is properly configured.

After the busy signal has been asserted at step 802, the sequencer then determines whether or not the bridging circuit has been properly configured (step 804) by checking the status of flag 324. The value stored in flag register 324 will indicate whether the bridging circuit 120 has been properly configured. If the value of flag 324 indicates that the bridging circuit 120 has not been properly configured, then the sequencer executes the read entire EEPROM subroutine at 806. This subroutine is illustrated in FIG. 10, and generally describes the procedure for reading the configuration programming information from the EEPROM and loading (or writing) it into the appropriate hardware of the bridging circuit 120 to thereby configure the entire bridging circuit.

Once the bridging circuit 120 has been properly configured using valid information stored in EEPROM 214, flag 324 is set at an appropriate value. However, as shown in steps 930 and 940 of FIG. 10, if it is determined that the information within EEPROM 214 is invalid (by checking a value of a particular memory location within the EEPROM), then the sequencer will not proceed with configuring the adaptor chip 120 using the information stored within the EEPROM. At this point, while the BUSY signal remains asserted, the host processor 102 (or the user) may program the EEPROM with valid configuration programming information through the PCMCIA interface by means of registers 208. The new configuration information written into the EEPROM will then be used by the sequencer to properly configure bridging circuit 120, and to set flag 324 at the appropriate value.

At step 808, after it has been determined that the bridging circuit 120 has been properly configured, the sequencer asserts a READY signal on line 235, indicating to the CPU of the computer system that the circuit may now be used to transfer data between BUS 125 and BUS 123. After this, at steps 809 and 810, the sequencer waits for a valid PCMCIA command to be received from the microprocessor 102 (FIG. 1).

It should be noted that where the adaptor chip 120 is used to bridge parallel bus systems other than PCMCIA, the bus system format of the command which the adaptor chip waits to receive at 809–810 will depend upon the bus system format utilized by the computer system which houses the adaptor chip. For purposes of illustration, it is assumed (as shown in FIGS. 1, 2A, 2B, and 3) that the computer system 100 utilizes a PCMCIA bus to communicate with the adaptor chip 120. Therefore, the chip 120 will wait for a valid PCMCIA command to be received from the microprocessor 102.

When the adaptor chip receives a valid PCMCIA command related to reading and/or writing information to/from the EEPROM, the adaptor chip executes the appropriate subroutine corresponding to the PCMCIA command it has received. Thus, for example, where the command is EEPROM WRITE ENABLE, the adaptor chip executes the EEPROM write enable command, thereby enabling the EEPROM to be written to (steps 812–814). If the command is EEPROM WRITE DISABLE, the adaptor chip executes the EEPROM write disable command, thereby disabling the EEPROM from being written to (steps 816–818).

If the command is EEPROM WRITE, the adaptor chip executes the EEPROM WRITE subroutine, generally illustrated in FIG. 9B. As shown in FIG. 9B, information is written into the EEPROM by sending address and data information out to the EEPROM via shift register 304b. Additionally, the adaptor circuit waits for the EEPROM to confirm that the data was received before it acknowledges to the host processor 102 that the write operation has been completed.

If the PCMCIA command received is EEPROM byte READ, the circuit executes the EEPROM READ subroutine, generally illustrated in FIG. 9A. As illustrated in FIG. 9A, the address of the location to be read from the EEPROM is loaded into register 304b and sent to the EEPROM. The data is then read from the desired EEPROM address and loaded into shift register 304a, whereupon it is transferred to data register 314, and ultimately to BUS 231, whereupon the information which was read can then be loaded into the appropriate hardware of the adaptor chip 120. Note that data register 314 is a 16-BIT register used for transferring blocks of data from and to BUS 123 and BUS 125. Data may be transferred on word access to the data register or byte access to the data register (discussed below).

If the command received is an EEPROM erase command, the adaptor chip will first enable the EEPROM to be written to, and then proceed to erase the entire EEPROM (steps 832–838).

At step 840, after each valid PCMCIA command received by the adaptor chip has been executed, the status done block 320 (FIG. 3) is set to STATUS=DONE to indicate to the CPU 102 that the adaptor chip has successfully carried out the command which it received.

SERIAL INTERFACE, SLAVE MODE

The above-described procedure illustrates one embodiment where the bridging circuit 120 of the present invention is reconfigured by reprogramming an external EEPROM 214. As discussed previously, an alternate embodiment is also contemplated wherein the reconfiguring of the bridging circuit is accomplished through information provided by a slave microprocessor. Where the bridging circuit is reconfigured using such a slave microprocessor, it is said that the circuit is operating in slave mode.

When the adaptor chip 120 is placed into the serial port slave mode, the EEPROM sequencer is disabled and the slave microprocessor provides some type of "serial interface" with external hardware. The external hardware can be used to program the on board register and the attribute memory of the adaptor chip. The first byte of data sent to the adaptor chip is the address that the slave CPU wants to talk to, the second byte is the command byte, and the third byte is the data. Additionally, the external hardware provides twenty-four clocks in order to read or write to a location in the adaptor chip. Also, upon de-asserting of the POR (power on reset) signal pin, the slave CPU will provide a clock source in the range of 1–20 Mhz.

Programming the on board attribute memory is a little different than the master mode. To write to the on board memory, first the slave CPU writes the address location at the attribute memory that is to be read or readen to in the attribute RAM data address register. Then the slave CPU writes or reads from the attribute RAM data register and this is the data to be read or readen at the specified address location. Note that after reading or writing to the attribute RAM data register, the attribute RAM address register is automatically incremented.

FIG. 11 generally illustrates the process of reconfiguring the bridging circuit 120 in slave mode. Referring back to FIG. 3, serial bus sequencer 302 includes a master/slave input for determining the particular mode under which the bridging circuit will operate (master mode or slave mode). In master mode, serial bus sequencer 302 outputs control signals 305 which include a serial clock and a strobe to the EEPROM to coordinate synchronized communication between the EEPROM and the adaptor chip 120. In serial mode, however, synchronization signals 305 are output from the slave microprocessor and are received as input signals to the serial bus sequencer 302.

With the master/slave input to serial bus sequencer 302 is set to slave, adaptor circuit 120 will follow the procedure generally illustrated in FIG. 11. As shown in FIG. 11, while in slave mode the adaptor chip 120 will sit idle until it receives a communication by the slave CPU (step 942). At step 944, once communication has been established between the adaptor chip and the slave CPU, the adaptor chip will receive an address from the slave CPU which corresponds to a particular location within the adaptor circuit which will either be read from or written to. Next, at steps 946–948, the adaptor circuit will receive a command from the slave CPU and will attempt to interpret and execute the command it has received.

The first step in executing the command received from the slave CPU is to determine whether the command is valid (step 950). If the command is not valid, the adaptor chip returns to its idle state whereupon it awaits another attempted communication by the slave CPU.

If the command is valid, the adaptor chip will execute the command and return to its idle state to await another communication by the slave CPU, as generally shown in steps 952–964.

In particular, if the command received is a valid WRITE command, the adaptor chip will then receive data into shift register 304*a* which is to be written into the appropriate address of the adaptor chip, whereupon, after receiving the data, the adaptor chip will then write the data into the appropriate internal hardware of the adaptor chip as specified by the address it received from the slave CPU (steps 952–956). If, on the other hand, the command by the slave CPU is a valid READ command, the adaptor chip will load the data contained within the particular address location (specified by the slave CPU) into data register 314, whereupon the adaptor chip will then output the data to the slave CPU via shift register 304*b* (steps 958–962).

Once a valid command by the slave microprocessor has been executed by the adaptor chip 120, the chip then returns to its idle state where it awaits another communication by the slave microprocessor. Accordingly, through this procedure, it is possible for a slave microprocessor to serially configure adaptor chip 120.

It should be noted that simultaneously, while the slave microprocessor is configuring bridging circuit 120 (although not shown in FIG. 11), the slave microprocessor issues a separate signal to cause bridging circuit 120 to assert the BUSY signal on the READY/BUSY line 235. After the slave microprocessor has finished configuring bridging circuit 120, it de-asserts this signal to thereby cause the adaptor chip 120 to assert a READY signal on line 235.

It should also be noted that, while configuring bridging circuit 120 (although not shown in FIG. 11), the slave microprocessor's hardware may control other aspects of bridging circuit 120 by setting/selecting, for example, the clock divide by mode, the bus override mode, the host microprocessor interrupt polarity, etc., if needed.

OTHER FEATURES OF THE PRESENT INVENTION

The present invention is designed to operate under a wide range of voltages. In particular, it may be desirable for the present invention to operate in a voltage range of three volts to 5.5 volts, which is a typical voltage range for peripheral controller circuits. The present invention may also utilize power control bits with a programmable power down timer, such as, for example, on the order of 250 microamps at five volts.

Adaptor chip 120 includes at least four card configuration register (CCR) extensions to provide communication from the PCMCIA BUS to a serial port. Additionally, adaptor chip 120 includes a revision register. The CCR registers and revision register are located within the attribute memory block 216, as shown in FIG. 6.

The present invention also provides window control, programmable wait state generators, reconfigurable memory or peripheral interfacing, data swapping, and shift select options.

As stated previously, the present invention provides programming of the off-board EEPROM through the PCMCIA interface using three special registers that are accessed like the CCR registers as defined by the PCMCIA specification. The host software can write and read each byte of the EEPROM through the special registers. After the host writes new values to the EEPROM through the special registers, the new values are loaded into the appropriate hardware of the adaptor CHIP 120 to thereby reconfigure the adapter chip. This reconfiguration may occur, for example, on a power on reset (POR) operation, or may occur at any other time desired by the host microprocessor.

As shown in FIGS. 4 and 5 adaptor chip 120 has several PCMCIA addressing mode attributes. There are several major addressing mode systems that are supported by the present invention to ensure PCMCIA compatibility. The ATA/IDE addressing mode using I/O addressing, independent I/O, and memory mode addressing is designed in the present invention to provide a mapping path from PCMCIA to a standard IDE interface integrated circuit. Therefore, all byte assignment and task file mapping necessary for PCMCIA defined ATA/IDE is provided by the adapter chip 120.

In addition to the sophisticated mapping provided to an IDE chip, there are an additional three sets of range and page registers for supporting a multitude of different peripheral chips. These range and page registers provide a way to select multiple peripheral where memory devices on one card with a multiple method of addressing or control line accesses. Either I/O or memory access are accommodated by the present invention. The PCMCIA access is converted to the appropriate data strobe conditions for external peripheral devices.

FIG. 4 shows a functional block diagram of the address block 202 of FIG. 2B. The function of block 202 is to interface the exchange of address information between two incompatible bus systems 123 and 125. As shown in FIG. 4, logic block 202 comprises of plurality of configurable registers 520 and a special register 502 (for mapping to IDE/ATA bus systems) for generating the various control signals 511 used in generating the address information which is eventually placed on line 221b. Also included within address block 202 is circuitry 550 which is used for exchanging information between a word bus system and a byte bus system. Circuitry 550 works in conjunction with duece sequencer circuitry 650 shown in FIG. 5 and with the circuitry shown in FIGS. 7A–7D. A more detailed description of the duece circuitry is provided below.

Figure 7B:
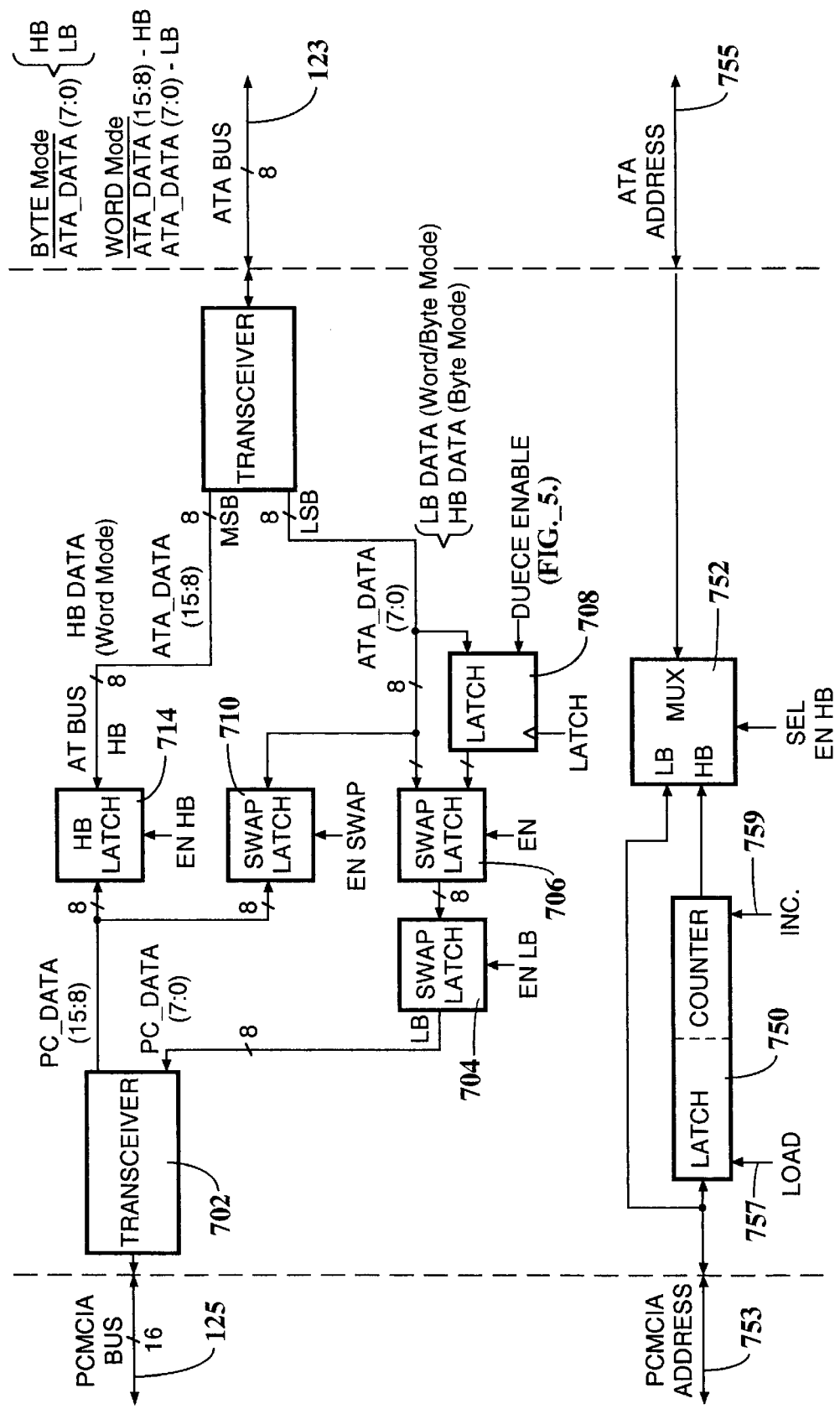
FIG. 7B shows a more detailed functional block diagram of the circuit of FIG. 7A.
Figures 2, 8:
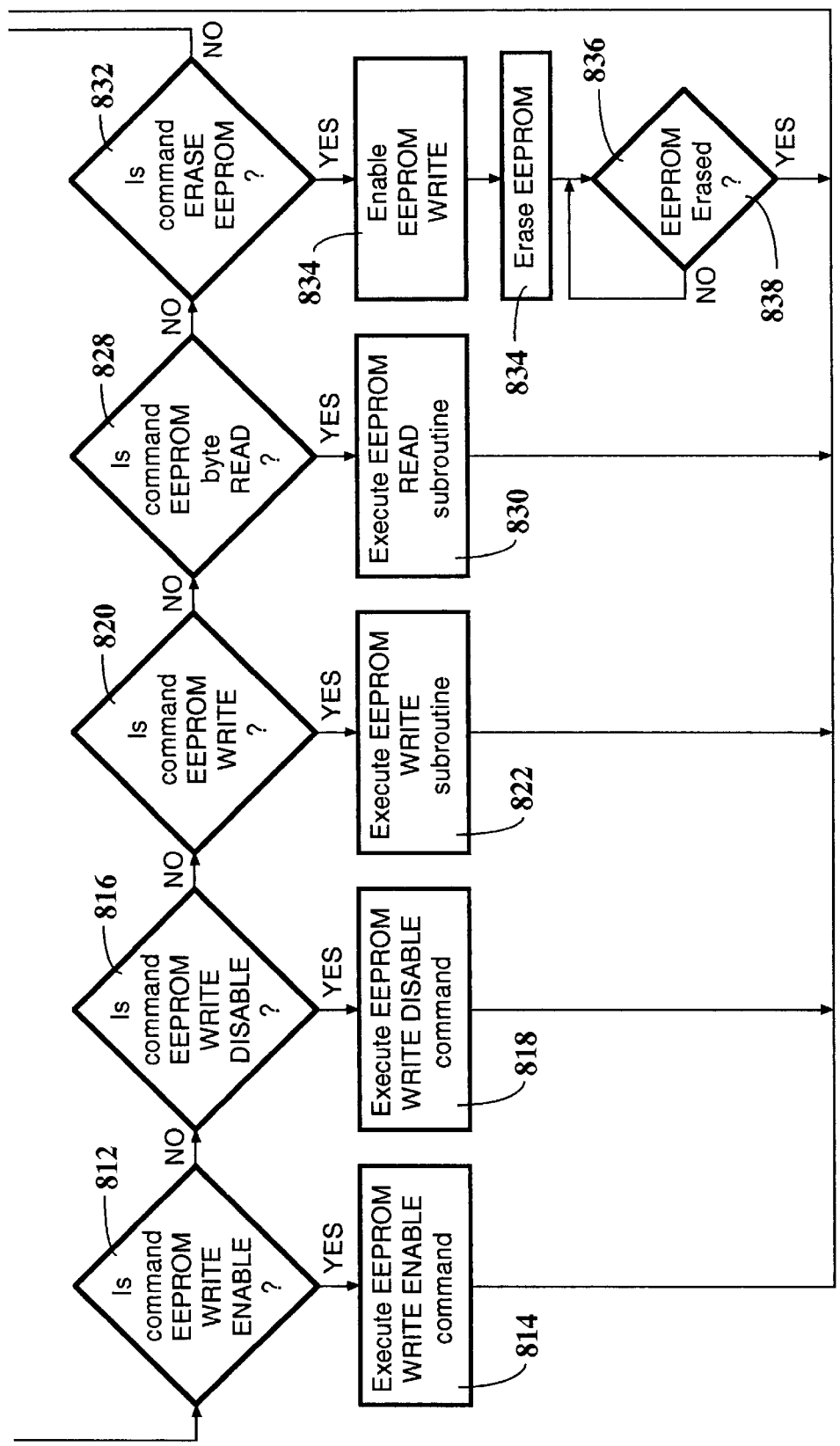

FIG. 5 shows a functional block diagram of the CONTROL/STATUS BLOCK 204 of FIG. 2. As shown in FIG. 5, the CONTROL/STATUS logic supplies the various chip select and data strobe signals for controlling the transfer of information between BUS 125 and BUS 123. Logic block 204 comprises a plurality of reconfigurable registers 620 and a special register 601 (for mapping to IDE/ATA bus systems) for generating the various chip select and data strobe signals used. Additionally, logic block 204 includes a programmable wait state generator 616a for generating the PCMCIA WAIT signal 616b, which cause the host microprocessor 102 to wait until the adaptor chip 120 has finished completing its current READ or WRITE operation before the microprocessor 102 issues a command for a subsequent READ or WRITE operation to the peripheral BUS 123. Lastly, also included within logic block 204 is duece sequencer circuit 650 for controlling the transfer of information from a word bus system to a byte bus system or vice versa. This circuit works in conjunction with the circuit 550 of FIG. 4 and with the circuitry shown in FIGS. 7A–7D (described below).

The duece circuitry of FIGS. 4 and 5 (items 550 and 650), when used in conjunction with the circuitry of FIGS. 7A–7D (described below), enables word to byte access between two parallel bus systems. The duece circuitry allows, for example, a 16-BIT host to access 8-BIT peripherals. When this circuitry is enabled, bridging circuit 120 is able to generate two peripheral write or read strobes on the local peripheral side when the host writes or reads 16 bytes of data. This mode allows a 16-BIT host to READ/WRITE two 8-BIT peripheral device registers with one 16-BIT access. When this mode is enabled and the bridging CIRCUIT 120 is in memory mode, the host can access the peripheral's 8-BIT registers by selecting an even address. Then the WRITE or READ strobe to the peripheral device is controlled through the WIDTH 614 and DELAY 612 inputs into the duece SEQUENCER 610.

COMMUNICATION BETWEEN WORD BUS SYSTEMS AND BYTE BUS SYSTEMS

Figure 12:
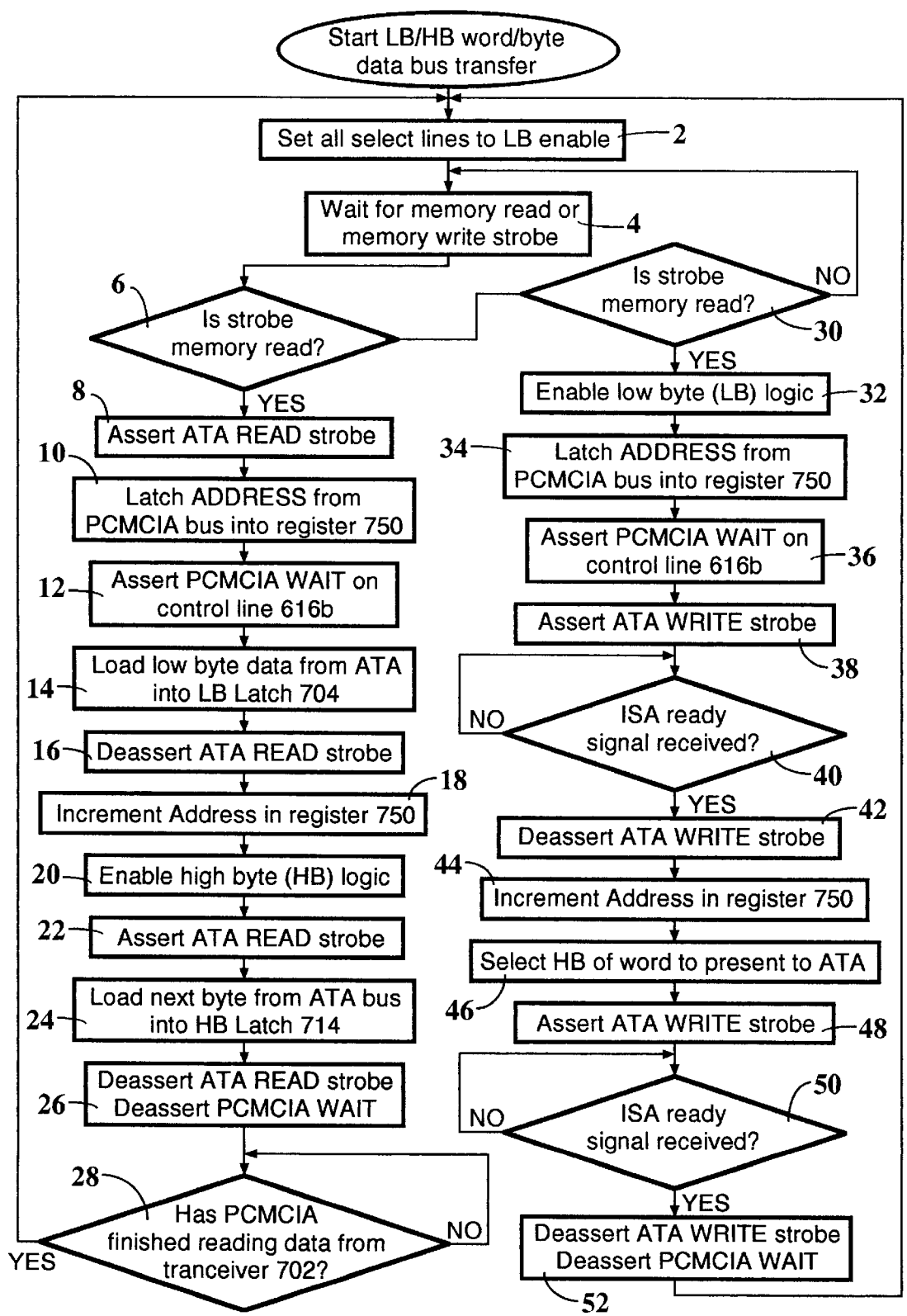
FIG. 12 is a flow diagram illustrating the transfer of information between a word-based bus system and a byte-based bus system using the bridging circuit of the present invention.

Occasionally, adaptor chip 120 will be required to interface a 16 BIT data bus with an 8 BIT data bus. To accommodate this interface, special circuitry shown in FIGS. 7A, 7B, 7C and 7D are included within the adaptor chip 120. The flow diagram of the read and write operations for exchanging data using the circuits of FIGS. 7A–7D is shown in FIG. 12. FIG. 12 shows a flow diagram illustrating the transfer of information between a byte bus system and a word bus system using the circuitry of FIGS. 7B and 7D.

As illustrated in FIGS. 7A–7D, adaptor chip 120 can be used to bridge a communication path between a word bus system (PCMCIA BUS 125) and a byte bus system (ATA BUS 123). As known to those skilled in the art, a word bus system will typically comprise a plurality of bytes which make up one word. PCMCIA bus systems define one word as 16 bits. Thus, in the examples shown in FIGS. 7A–7D, a word on the PCMCIA bus 125 comprises two 8-BIT bytes, a high byte (HB) including BIT 15–BIT 8, and a low byte (LB) including BIT 7–BIT 0. ATA BUS 123, on the other hand, utilizes a byte format, meaning that BUS 123 is only 8 bits wide.

FIG. 7A illustrates the transfer of data during a PCMCIA read operation, wherein word BUS 125 reads information from byte BUS 123. A more detailed description of the circuit of FIG. 7A is illustrated in 7B.

The protocol for the PCMCIA host READ operation is shown in FIG. 12. The flow diagram of FIG. 12 will now be described with respect to FIG. 7B.

Initially, before any READ or WRITE operation, all select lines shown in FIGS. 7B and 7D are set to low byte enable. The adaptor chip then waits for a memory read or memory write strobe from the host microprocessor 102. Assuming that the strobe is memory read, adaptor chip 120 asserts an ATA READ strobe to BUS 123. The ATA READ strobe is issued from control status block 204 (FIG. 5) along one of the data strobe lines 605. At step 10 (FIG. 12) the adaptor chip latches the address to be read from the PCMCIA bus into register 750 (FIG. 7B). At step 12, adapter chip 120 asserts a PCMCIA WAIT signal on control line 616b (FIG. 5). The PCMCIA wait signal causes the host processor 102 to wait until adaptor chip 120 has finished handling the rest of the read protocol for that read operation before the host processor issues another peripheral read or write command. At step 14, the low byte data (BITS 7–0) from ATA BUS 123 is latched into low byte latch 704. At step 16 the ATA READ strobe is de-asserted. The de-assertion of the READ strobe is caused by disable strobe line 507 (FIG. 5). The function of disable strobe line 507 is to cause the IO read and write strobes to be de-asserted and then asserted again to thereby create a double pulse for communicating between a word bus system and a byte bus system. At step 18, the address in register 750 is incremented in order to read the corresponding high byte data (bits 15–8) from the ATA bus. At step 20, the high byte logic of FIG. 7B is enabled. At step 22, the ATA READ strobe is again asserted by deactivating the disable strobe signal 507 (FIG. 5). At step 24, the next byte (the high byte) from the ATA bus is loaded into the HB latch 714. At this point, both the high byte (HB) and the low byte (LB) data is available to PCMCIA bus 125. At step 26, the ATA READ strobe is de-asserted, and the PCMCIA WAIT signal is de-asserted, allowing the host CPU 102 to read the data from transceiver 702 onto PCMCIA BUS 125.

When the PCMCIA has finished reading the data from transceiver 702, the select lines within the adaptor chip 120 will again be set to low byte enable, and the adaptor chip will again wait for a memory read or write strobe.

FIG. 7C illustrates the transfer of data during a PCMCIA host write operation. The circuit of FIG. 7C is illustrated in greater detail in FIG. 7D. The procedure for handling a PCMCIA host write command is shown in FIG. 12. This procedure will now be described in reference to FIG. 7D.

Before the memory write strobe is received from PCMCIA, all select lines within adaptor chip 120 are set to low byte enable. At step 32, once the memory WRITE strobe has been received, the low byte logic of FIG. 7D is enabled, thereby presenting the low byte of the data word (BITS 7–0) to the ATA BUS. At step 34, the address for the low byte is read from PCMCIA into register 750 (FIG. 7B). At step 36, the PCMCIA WAIT signal is asserted on control line 616b. At step 38, the ATA WRITE strobe is asserted, causing the low byte data to be written to the ATA bus at the address stored in register 750. The adaptor chip then waits to receive a ready signal from the ATA bus, indicating that the data has been received. After the ready signal is received, at step 42, the ATA WRITE strobe is de-asserted by the disable strobe line 507 (FIG. 5). At step 44, the address within register 750 is incremented in preparation for writing the high byte of the data word to the ATA bus. At step 46, the high byte logic of FIG. 7D is enabled, thereby presenting the high byte (BITS 15–8) of the data word to the ATA bus. At step 48, the ATA WRITE strobe is again asserted by de-asserting the disable STROBE signal 507 (FIG. 5). At step 52, after the adapter chip receives another READY signal from the ATA bus (indicating that the data has been received), the ATA WRITE strobe is de-asserted, and the PCMCIA WAIT signal is de-asserted, allowing the host CPU 102 to perform another READ or WRITE operation.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope or spirit of the invention as defined in the appended claims.

It is claimed:

1. For use in a computer system having a CPU and a first parallel bus system, a reprogrammable adaptor circuit for bridging the first parallel bus system to a second parallel bus system, wherein the first bus system is not directly compatible with the second bus system, said adaptor circuit comprising:

a bridging circuit responsive to configuration programming information for bridging a communication path between the first bus system and the second bus system;

a memory storage device for storing said configuration programming information used to configure said bridging circuit;

programming means for applying said configuration programming information to configure said bridging circuit to establish said bridged communication path; and means in communication with the CPU for changing the configuration programming information stored within said memory storage device while the computer system is operating, without physically removing the storage device or the bridging circuit from the adaptor circuit, thereby hotly reconfiguring said bridging circuit, wherein the changed configuration information allows the bridging circuit to bridge a communication path between the first bus system and a third parallel bus system, the third parallel bus system being of a different type than the second parallel bus system.

2. The circuit of claim 1, wherein said programming means comprises means for preventing access to said bridging circuit while said bridging circuit is being configured by said programming means, and for allowing access to said bridging circuit after said bridging circuit has been configured; and wherein said changing means comprises a plurality of registers for latching at least a portion of said changed configuration information to facilitate the changing of configuration program information stored within said memory storage device.

3. The circuit of claim 1 wherein said changing means includes means for writing data and address information into said storage device without removing the storage device from the computer system.

4. The circuit of claim 1 wherein said memory storage device comprises an EEPROM.

5. The circuit of claim 1 wherein said memory storage device comprises a slave microprocessor and memory storage componentry.

6. The circuit of claim 1 wherein said first bus system is a PCMCIA compatible bus.

7. A computer system for communicating between a first parallel bus system and a second parallel bus system, wherein the first bus system is not directly compatible with the second bus system, said computer system comprising:

a CPU;

at least one peripheral port for providing a communication path between the first parallel bus system and the second parallel bus system;

a reconfigurable adaptor circuit connected to said peripheral port for bridging the communication path between the first parallel bus system and the second parallel bus system; and means in communication with said CPU for hotly reconfiguring said adaptor circuit while the computer system is operating, without physically removing the adaptor circuit from the computer system to enable the adaptor circuit to bridge a communication path between the first bus system and a third parallel bus system, the third parallel bus system being of a different type than the second parallel bus system.

8. The circuit of claim 7 wherein said reconfiguring means comprises:

means for preventing access to said adaptor circuit while said adaptor circuit is being reconfigured by said reconfiguring means, and for allowing access to said adaptor circuit after said adaptor circuit has been reconfigured; and a plurality of registers for latching configuration information related to the reconfiguring of said adaptor circuit to facilitate the reconfiguring of said adaptor circuit.

9. The circuit of claim 7 wherein said reconfiguring means comprises a memory storage device for storing configuration information used to reconfigure said adaptor circuit.

10. The circuit of claim 9 wherein said memory storage device comprises an EEPROM.

11. The circuit of claim 9 wherein said memory storage device comprises a slave microprocessor and memory storage componentry.

12. The computer system of claim 9 wherein said reconfiguring means further comprises means for writing data and address information into said storage device without removing the storage device from the computer system.

13. The circuit of claim 7 wherein said first bus system is a PCMCIA compatible bus.

14. In a computer system comprising a CPU, a first parallel bus system, at least one peripheral port, and a reconfigurable bridging circuit connected to the peripheral port for bridging a communication path between the first parallel bus system and a plurality of other parallel bus systems which are not directly compatible with the first bus system, wherein the plurality of other parallel bus systems includes a second parallel bus system and a third parallel bus system, a method for communicating between the first bus system and at least one of the plurality of other bus systems via the peripheral port and bridging circuit, said method comprising the steps of:

(a) configuring the bridging circuit to bridge a communication path between the first bus system and the second bus system without physically removing said bridging circuit from the computer system;

(b) communicating data between the first bus system and the second bus systems via the peripheral port and configured bridging circuit;

(c) hotly reconfiguring the bridging circuit to bridge a communication path between the first bus system and the third bus system, while the computer system is operating, without physically removing said bridging circuit from the computer system; and (d) communicating data between the first bus system and the third bus systems via the peripheral port and reconfigured bridging circuit the third parallel bus system being of a different type than the second parallel bus system.

15. The method of claim 14 further including the steps of:

asserting a BUSY signal to the CPU during at least a portion of time when the bridging circuit is being reconfigured to prevent access to said bridging circuit, and asserting a READY signal to the CPU during at least a portion of time when the bridging circuit is not being reconfigured to allow access to said bridging circuit.

16. The method of claim 14 wherein steps (a) and (c) each include the step of configuring the bridging circuit to bridge a communication path between a PCMCIA bus system and the second bus system without removing the bridging circuit from the computer system.

17. In a computer system comprising a CPU, a first parallel bus system, at least one peripheral port, and a reconfigurable bridging circuit connected to the peripheral port for bridging a communication path between the first parallel bus system and a plurality of other parallel bus systems not directly compatible with the first bus system, said computer system further comprising a memory storage device for storing configuration programming information used to configure the bridging circuit to bridge the first bus system with at least one of the plurality of other bus systems, a method for establishing a communication path between the first bus system and one of the plurality of other bus systems via the peripheral port and bridging circuit, said method comprising the steps of:

(a) storing configuration programming information in the memory storage device, while the computer system is operating, without physically removing the storage device from the computer system;

(b) hotly configuring the bridging circuit, using the stored configuration programming information, while the computer system is operating, to bridge a communication path between the first bus system and a second bus system of the plurality of other bus systems without removing the bridging circuit from the computer system; and (c) establishing a communication path between the first bus system and the second bus system via the peripheral port and bridging circuit, enabling an exchange of information to take place between the two parallel bus systems, the third parallel bus system being of a different type than the second parallel bus system.

18. The method of claim 17 wherein said storing step (a) comprises the step of writing data and address information into the memory storage device without physically removing the storage device from the computer system.

19. The method of claim 17 further comprising the steps of:

changing the configuration programming information in the memory storage device without physically removing the storage device from the computer system;

reconfiguring the bridging circuit, using the changed configuration programming information, to bridge a communication path between the first parallel bus system and a third bus system of the plurality of other bus systems without removing the bridging circuit from the computer system; and establishing a communication path between the first bus system and the third bus system via the peripheral port and bridging circuit, enabling an exchange of information to take place.

20. The method of claim 19 wherein said changing step comprises the step of writing data and address information into the memory storage device without physically removing the storage device from the computer system.

21. The method of claim 19 further including the steps of:

asserting a BUSY signal to the CPU during at least a portion of time when the bridging circuit is being reconfigured to prevent access to said bridging circuit, and asserting a READY signal to the CPU during at least a portion of time when the bridging circuit is not being reconfigured to allow access to said bridging circuit.

22. The method of claim 17 wherein said configuring step (b) includes the step of configuring the bridging circuit to bridge a communication path between a PCMCIA bus system and the second bus system without removing the bridging circuit from the computer system.

23. The method of claim 17 wherein said configuring step (b) includes the step of hotly configuring the bridging circuit, using the stored configuration programming information, without requiring that the computer system be rebooted.

24. In a computer system comprising a CPU, a first parallel bus system, at least one peripheral port, and a reconfigurable bridging circuit connected to the peripheral port for bridging a communication path between the first parallel bus system and a plurality of other parallel bus systems not directly compatible with the first bus system, said computer system further comprising a memory storage device for storing configuration programming information used to configure the bridging circuit to bridge the first bus system with at least one of the plurality of other bus systems, a method for reconfiguring the bridging circuit to bridge a communication path between the first bus system and one of the plurality of other bus systems, said method comprising the steps of:

hotly writing configuration programming information into the memory storage device, while the computer system is operating, without physically removing the storage device from the computer system;

reading the rewritten configuration programming information from the memory storage device; and using the configuration programming information read from the memory storage device to hotly reconfigure the bridging circuit, while the computer system is operating to bridge a communication path between the first bus system and one of the plurality of other bus systems, wherein the one of the other plurality of parallel bus systems is of a different type than another of the other plurality of parallel bus systems.

25. The method of claim 24 wherein said using step includes the step of using the configuration programming information read from the memory storage device to reconfigure the bridging circuit to bridge a communication path between the first bus system and one of the plurality of other bus systems, without requiring that the computer system be rebooted.

26. For use in a computer system having a CPU, a first parallel bus, and a receptacle for connecting said system to a plurality of other parallel busses, wherein a communication protocol of the first bus is not directly compatible with a communication protocol of at least one of the other busses, an insertable, reprogrammable adaptor circuit connectable to said receptacle and said other parallel busses for transparently interfacing the first bus with any one of the plurality of other busses, said adaptor circuit comprising:

a hot reprogrammable bridging circuit responsive to configuration programming information for interfacing the first bus with any one of the other busses, wherein said bridging circuit includes means for performing protocol conversion between said first bus and said one other bus;

a memory storage device located on said adaptor circuit for storing said configuration programming information used to configure said bridging circuit;

programming means located on said adaptor circuit for applying said configuration programming information to configure said bridging circuit to interface the first bus with said one other bus; and bus identification means located on said adaptor circuit and in communication with said programming means for automatically identifying the communication protocol of said first bus, and for automatically causing said programming means to use at least a first portion of said configuration programming information to configure said bridging circuit to communicate with said first bus using said first bus communication protocol;

said bus identification means further including secondary means responsive to a request from said first bus to communicate with one of the plurality of other busses for automatically identifying the communication protocol of said other bus; and for automatically causing said programming means to use at least a second portion of said configuration programming information to configure said bridging circuit to communicate with said other bus using the communication protocol of said other bus, wherein said bridging circuit is thereby configured to interface said first bus with said other bus, wherein the one of the other plurality of parallel bus systems is of a different type than another of the other plurality of parallel bus systems.

27. The adaptor circuit of claim 26 wherein said secondary means is further responsive to a request from said first bus to communicate with a different one of the plurality of other busses for automatically identifying the communication protocol of said different bus; and for automatically causing said programming means to use at least a third portion of said configuration programming information to hot reconfigure said bridging circuit to interface said first bus with said different bus without causing a bus error or system error.

28. The circuit of claim 27 wherein said secondary means further causes said bridging circuit to be hot reconfigured to interface said first bus with said different bus without resetting or rebooting the computer system.

29. The circuit of claim 27 wherein said bridging circuit, said memory storage device, said programming means, said bus identification means and said secondary means cooperate together to cause said bridging circuit to be hot reconfigured to interface said first bus with said different bus without utilizing the CPU to reconfigure the bridging circuit.

30. The circuit of claim 27 wherein said memory storage device comprises an EEPROM.

31. The circuit of claim 27 wherein said memory storage device comprises a slave microprocessor and memory storage componentry.

32. The adaptor circuit of claim 26 wherein said bridging circuit further comprises:

means for performing buffering between said first bus and said other bus; and means for performing speed matching of information communicated between said first bus and said other bus.

33. The circuit of claim 26 wherein said programming means comprises means for preventing access to said bridging circuit while said bridging circuit is being configured by said programming means, and for allowing access to said bridging circuit after said bridging circuit has been configured.

34. For use in a computer system having a CPU, a first parallel bus, and a receptacle for connecting said system to a plurality of other parallel busses, wherein a communication protocol of the first bus is not directly compatible with a communication protocol of at least one of the other busses, a reprogrammable adaptor circuit connectable to said receptacle and said other parallel busses for interfacing the first bus with any one of the plurality of other busses, said adaptor circuit comprising:

a hot reprogrammable bridging circuit responsive to configuration programming information for interfacing the first bus with any one of the other busses, wherein said bridging circuit includes means for performing protocol conversion between said first bus and said one other bus;

a memory storage device in communication with said CPU for storing said configuration programming information used to configure said bridging circuit;

programming means in communication with said CPU for applying said configuration programming information to configure said bridging circuit to interface the first bus with said one other bus;

bus identification means in communication with said programming means for causing said programming means to use at least a first portion of said configuration programming information to configure said bridging circuit to communicate with said first bus using said first bus communication protocol, and for causing said programming means to use at least a second portion of said configuration programming information to configure said bridging circuit to communicate with said other bus using the communication protocol of said other bus; and means in communication with the CPU for changing at least a portion of the configuration programming information stored within said memory storage device while the system is in operation, without causing a system or bus error, and without physically removing the storage device or the bridging circuit from the adaptor circuit;

wherein said secondary means is further responsive to a request from said first bus to communicate with a different one of the plurality of other busses for causing said programming means to use said changed configuration programming information to hot reconfigure said bridging circuit to interface said first bus with said different bus, wherein the one of the other plurality of parallel bus systems is of a different type than the different one of the other plurality of parallel bus systems.

35. The system of claim 34 wherein said adaptor circuit further comprises:

means for performing buffering between said first bus and said second bus; and means for performing speed matching of information communicated between said first bus and said second bus.

36. The circuit of claim 34 wherein, said programming means comprises means for preventing access to said adaptor circuit while said adaptor circuit is being reconfigured by said reconfiguring means, and for allowing access to said adaptor circuit after said adaptor circuit has been reconfigured; and wherein said changing means comprises a plurality of registers for intermediately latching new configuration information related to the reconfiguring of said adaptor circuit to facilitate the hot reconfiguration of said adaptor circuit without causing a system or bus error.

37. The circuit of claim 34 wherein said memory storage device comprises an EEPROM.

38. The circuit of claim 34 wherein said memory storage device comprises a slave microprocessor and memory storage componentry.

39. In a computer system comprising a CPU, a first parallel bus, at least one receptacle, and a hot reconfigurable bridging circuit connected to the receptacle for bridging a communication path between the first parallel bus and a plurality of other parallel buses which are not directly compatible with the first bus, a method for transparently communicating between the first bus and at least one of the plurality of other buses via the receptacle and bridging circuit, said method comprising the steps of:

(a) identifying a communication protocol of said first bus;

(b) using a first portion of configuration programming information to configure said bridging circuit to communicate with said first bus using said first bus communication protocol;

(c) upon receiving a request from said first bus to communicate with one of the plurality of other busses, identifying a communication protocol of said other bus;

(d) using a second portion of said configuration programming information to configure said bridging circuit to communicate with said other bus using the communication protocol of said other bus, wherein said bridging circuit is thereby configured to interface said first bus with said other bus; and (e) upon receiving a request from said first bus to communicate with a different one of the plurality of other busses, identifying a communication protocol of said different bus, and using a third portion of said configuration programming information to hot reconfigure said bridging circuit to interface said first bus with said different bus without causing a bus error or system error, wherein the one of the other plurality of parallel bus systems is of a different type than the different one of the other plurality of parallel bus systems.

40. The method of claim 39 further including the steps of:

using the bridging circuit to perform protocol conversion between the first bus and said other bus; and using the reconfigured bridging circuit to perform protocol conversion between the first bus and the different bus.

41. The method of claims 40 further including the steps of:

using the bridging circuit to perform buffering between the first bus and the other bus;

using the bridging circuit to perform speed matching of information communicated between the first bus and the other bus;

using the reconfigured bridging circuit to perform buffering between the first bus and the different bus; and using the reconfigured bridging circuit to perform speed matching of information communicated between the first bus and the different bus.

42. The method of claim 39 wherein said reconfiguration step (e) includes the step of reconfiguring said bridging circuit to interface said first bus with said different bus without resetting or rebooting the computer system.

43. The method of claim 39 further including the steps of:

asserting a BUSY signal during at least a portion of time while the bridging circuit is being reconfigured to prevent access to said bridging circuit, and asserting a READY signal during at least a portion of time while the bridging circuit is not being reconfigured to allow access to said bridging circuit.

44. The method of claim 39 wherein said reconfiguration step (e) includes the step of reconfiguring said bridging circuit, using at least a portion of the rewritten configuration programming information, to interface said first bus with said different bus without utilizing the CPU to reconfigure the bridging circuit.

45. In a computer system comprising a CPU, a first parallel bus, at least one receptacle, and a reconfigurable bridging circuit connected to the receptacle for interfacing the first parallel bus with a plurality of other parallel buses not directly compatible with the first bus, said computer system further comprising a memory storage device located on the bridging circuit for storing configuration programming information used to configure the bridging circuit to interface the first bus with at least one of the plurality of other buses, a method for interfacing the first bus with one of the plurality of other buses via the receptacle and bridging circuit, said method comprising the steps of:

(a) using at least a first portion of the configuration programming information to configure said bridging circuit to communicate with said first bus using a communication protocol of the first bus;

(b) using at least a second portion of said configuration programming information to configure said bridging circuit to communicate with said other bus using a communication protocol of said other bus;

(c) using the CPU to change at least a portion of the configuration programming information stored within the memory storage device while the system is in operation, without causing a system or bus error, and without physically removing the storage device or the bridging circuit from the adaptor circuit; and (d) using said changed configuration programming information to hot reconfigure said bridging circuit to interface said first bus with said different bus while the system is in operation, without causing a system or bus error, wherein said step (d) includes the step of using at least a second portion of said changed configuration programming information to reconfigure said bridging circuit to communicate with said different bus using a communication protocol of said different bus, wherein the one of the other plurality of parallel bus systems is of a different type than the different one of the other plurality of parallel bus systems.

46. The method of claim 45 further including the steps of:

using the bridging circuit to perform protocol conversion between the first bus and said other bus; and using the reconfigured bridging circuit to perform protocol conversion between the first bus and the different bus.

47. The method of claim 46 further including the steps of:

using the bridging circuit to perform buffering between the first bus and the other bus;

using the bridging circuit to perform speed matching of information communicated between the first bus and the other bus;

using the reconfigured bridging circuit to perform buffering between the first bus and the different bus; and using the reconfigured bridging circuit to perform speed matching of information communicated between the first bus and the different bus.

48. The method of claim 45 wherein said reconfiguration step (d) includes the step of reconfiguring said bridging circuit to interface said first bus with said different bus without resetting or rebooting the computer system.

49. The method of claim 45 further including the steps of:

asserting a BUSY signal during at least a portion of time while the bridging circuit is being reconfigured to prevent access to said bridging circuit;

asserting a READY signal during at least a portion of time while the bridging circuit is not being reconfigured to allow access to said bridging circuit; and latching new configuration information related to the reconfiguration of said bridging circuit to facilitate the hot reconfiguration of said adaptor circuit without causing a system or bus error.

50. For use in a computer system having a CPU and a parallel PCMCIA bus system, a reprogrammable adaptor circuit for bridging the PCMCIA parallel bus system to a non-PCMCIA parallel bus system:

a bridging circuit responsive to configuration programming information for bridging a communication path between the parallel PCMCIA bus system and non-PCMCIA parallel bus;

a memory storage device for storing said configuration programming information used to configure said bridging circuit;

programming means for applying said configuration programming information to configure said bridging circuit to establish said bridged communication path; and means in communication with the CPU for changing the configuration programming information stored within said memory storage device while the computer system is operating, without physically removing the storage device or the bridging circuit from the adaptor circuit, thereby hotly reconfiguring said bridging circuit, wherein the changed configuration information allows the bridging circuit to bridge a communication path between the non-PCMCIA parallel bus system and an additional parallel bus system.

* * * * *